United States Patent [19]

Gassaway et al.

[11] 4,393,488

[45] Jul. 12, 1983

[54] EXPLORATION SYSTEM AND METHOD OF DETERMINING ELASTIC PARAMETERS AND SUBSURFACE SHAPE OF AN EARTH FORMATION SO AS TO INDICATE LIKELIHOOD OF THE FORMATION BEING AN ORE, MARKER ROCK, ECONOMIC MINERAL OR THE LIKE

[75] Inventors: Gary S. Gassaway; Henry J. Richgels, both of San Rafael; James I. Foster, Novato, all of Calif.

[73] Assignee: Chevron Research Company, San Francisco, Calif.

[21] Appl. No.: 176,607

[22] Filed: Aug. 8, 1980

Related U.S. Application Data

[63] Continuation of Ser. No. 952,887, Oct. 8, 1978, abandoned, which is a continuation-in-part of Ser. No. 238,503, Feb. 26, 1981, abandoned.

[51] Int. Cl.³ ............................................. G01V 1/30
[52] U.S. Cl. .................................... 367/75; 367/36; 367/58; 364/421
[58] Field of Search .......................... 367/36, 58, 75; 364/421

[56] References Cited

U.S. PATENT DOCUMENTS

| 2,267,858 | 12/1941 | Dix | 367/58 |
| 2,596,463 | 5/1952 | Barthelmes | 367/36 |
| 2,658,578 | 11/1953 | Oliphant | 367/75 |
| 3,302,164 | 1/1967 | Waters et al. | 367/75 |

FOREIGN PATENT DOCUMENTS

| 256295 | 3/1970 | U.S.S.R. | 367/68 |

OTHER PUBLICATIONS

Enescu, "Time Field and Hodographs of Seismic Waves Diffracted . . . ", 1965, pp. 113-119, Seria Geof., vol. 3, #1.
Barbu "Same Errors in . . . Hodographs", 1966, pp. 174-178, Petral. Si Gage, vol. 17, #4.
Vortanov et al., "The System of Algonthms . . . ", 1974, pp. 48-53, Razwed., Geofig., USSR.
Nazarny, "Determining . . . Hodographs of Reflected Waves", 1965, pp. 84-91, Prik. Geofiz., vol. 45.

*Primary Examiner*—Nelson Moskowitz
*Attorney, Agent, or Firm*—H. D. Messner; Edward J. Keeling

[57] ABSTRACT

The present invention provides for the accurate mapping of shallow crustal earth formations by means for refractive seismic waves to identify structure as well as elastic parameters of the strata undergoing survey to indicate deposits of ore, marker rock, economic minerals and the like. In one aspect of the present invention, a "roll-along" technique is used in the field, such technique being both practical and economical. In accordance with another aspect of the invention, there is a provision for (i) accurate separation and determination of seismic shear and compressional responses using three-dimensional hodographs; (ii) stacking displays that allow for accurate identification of shape of the surveyed strata; and (iii) final depth displays of the refracting bed segments associated with seismic shear and compressional wave velocities as well as Poisson's ratio to indicate presence of ore, marker rocks, economic minerals and the like.

8 Claims, 26 Drawing Figures

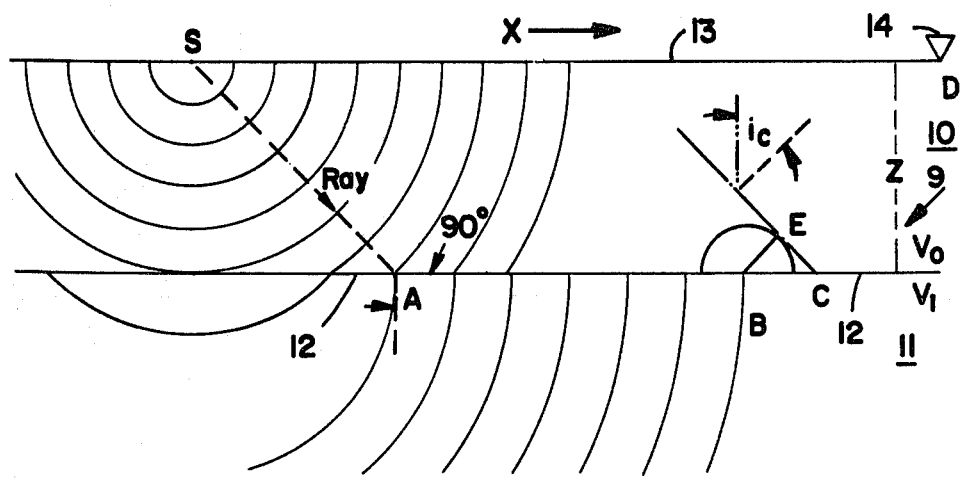
FIG_1
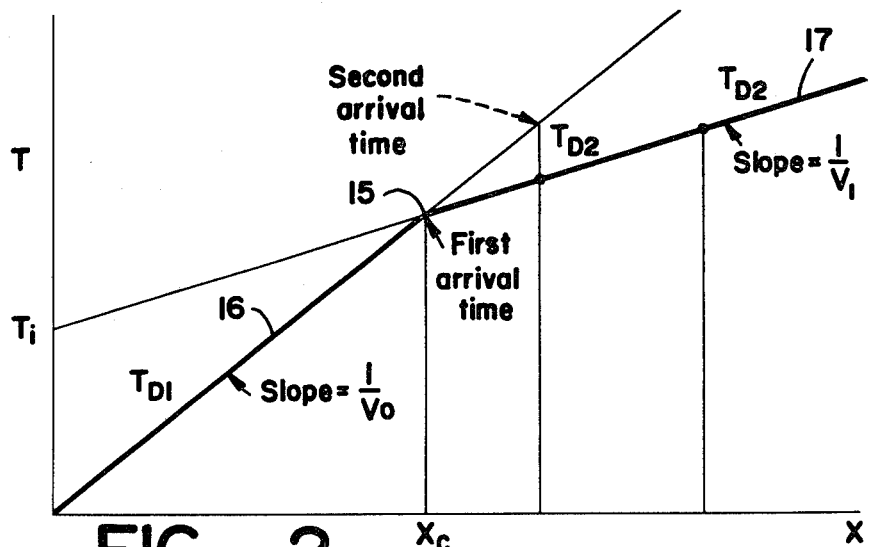
FIG_2
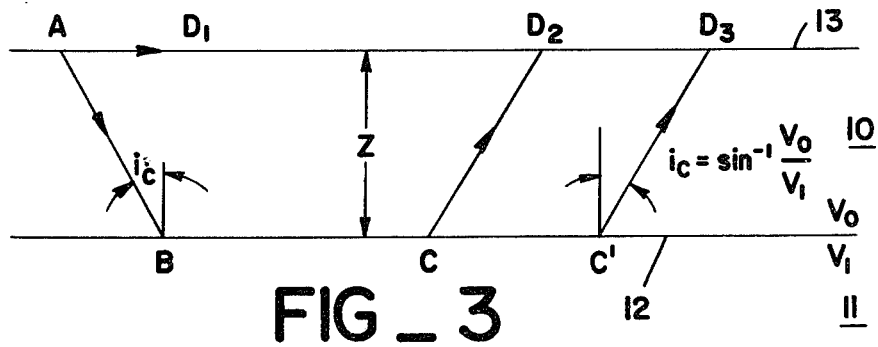
FIG_3

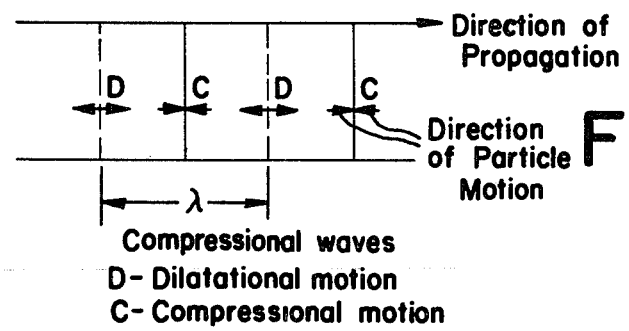
FIG_4a
Compressional waves
D- Dilatational motion
C- Compressional motion
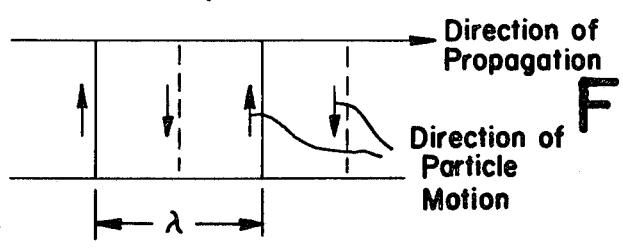
FIG_4b
Shear Waves
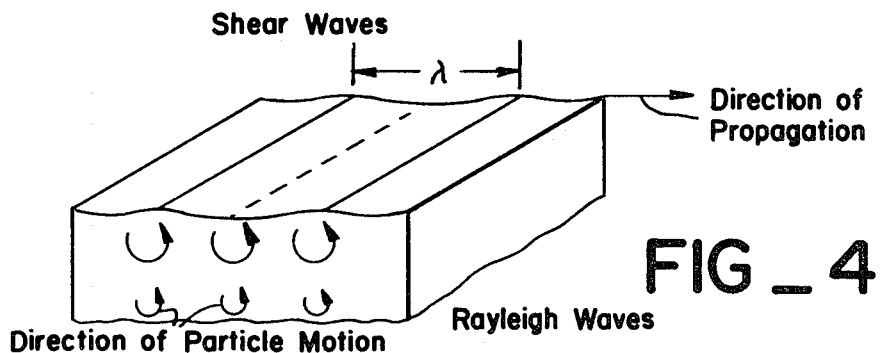
FIG_4c
Rayleigh Waves
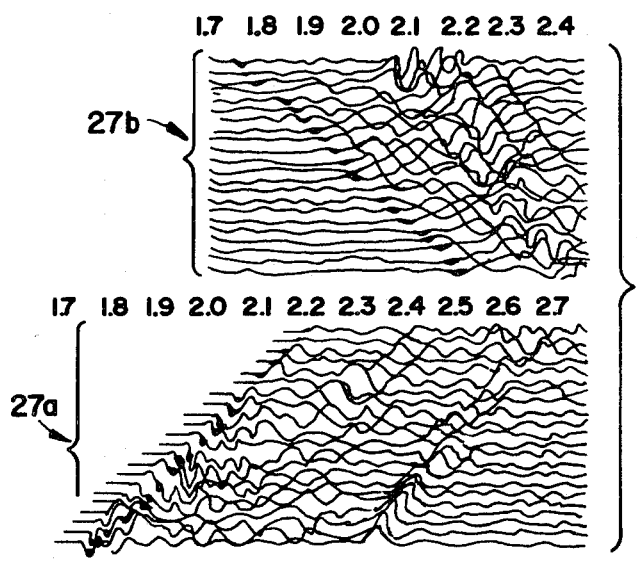
FIG_7

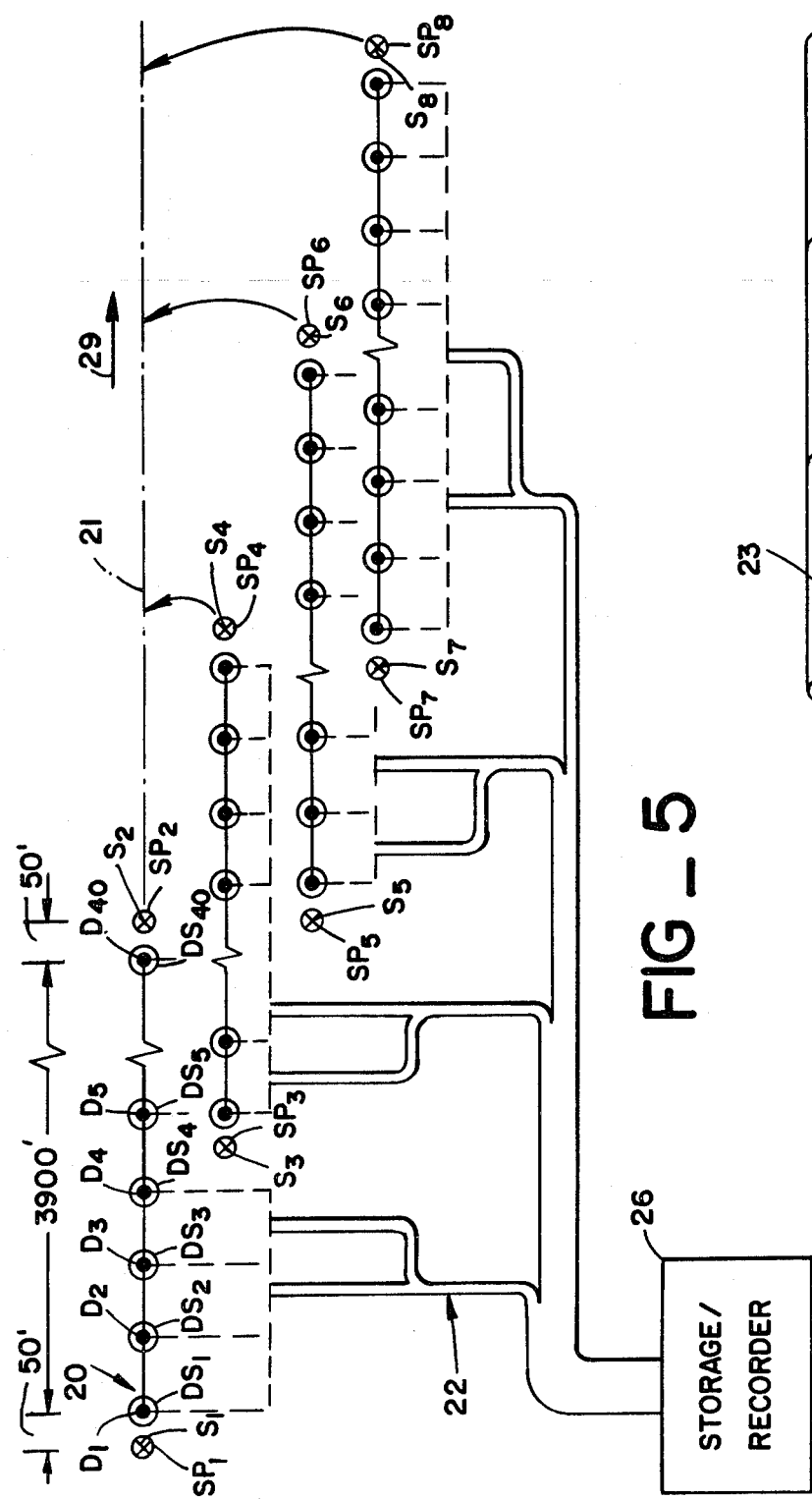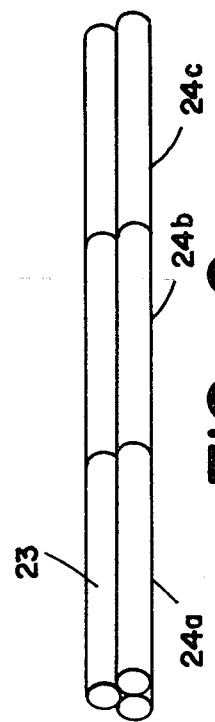

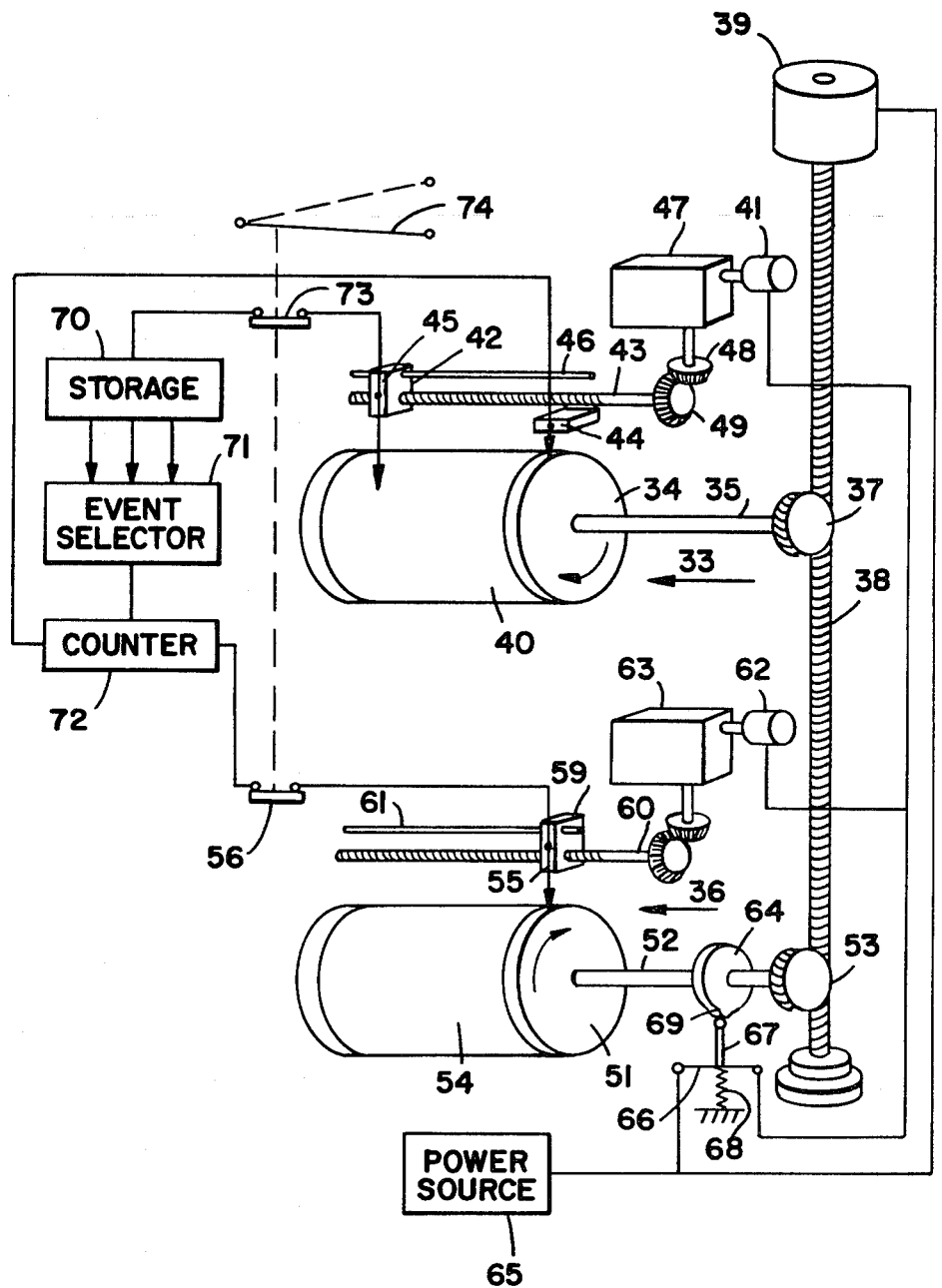
FIG_8

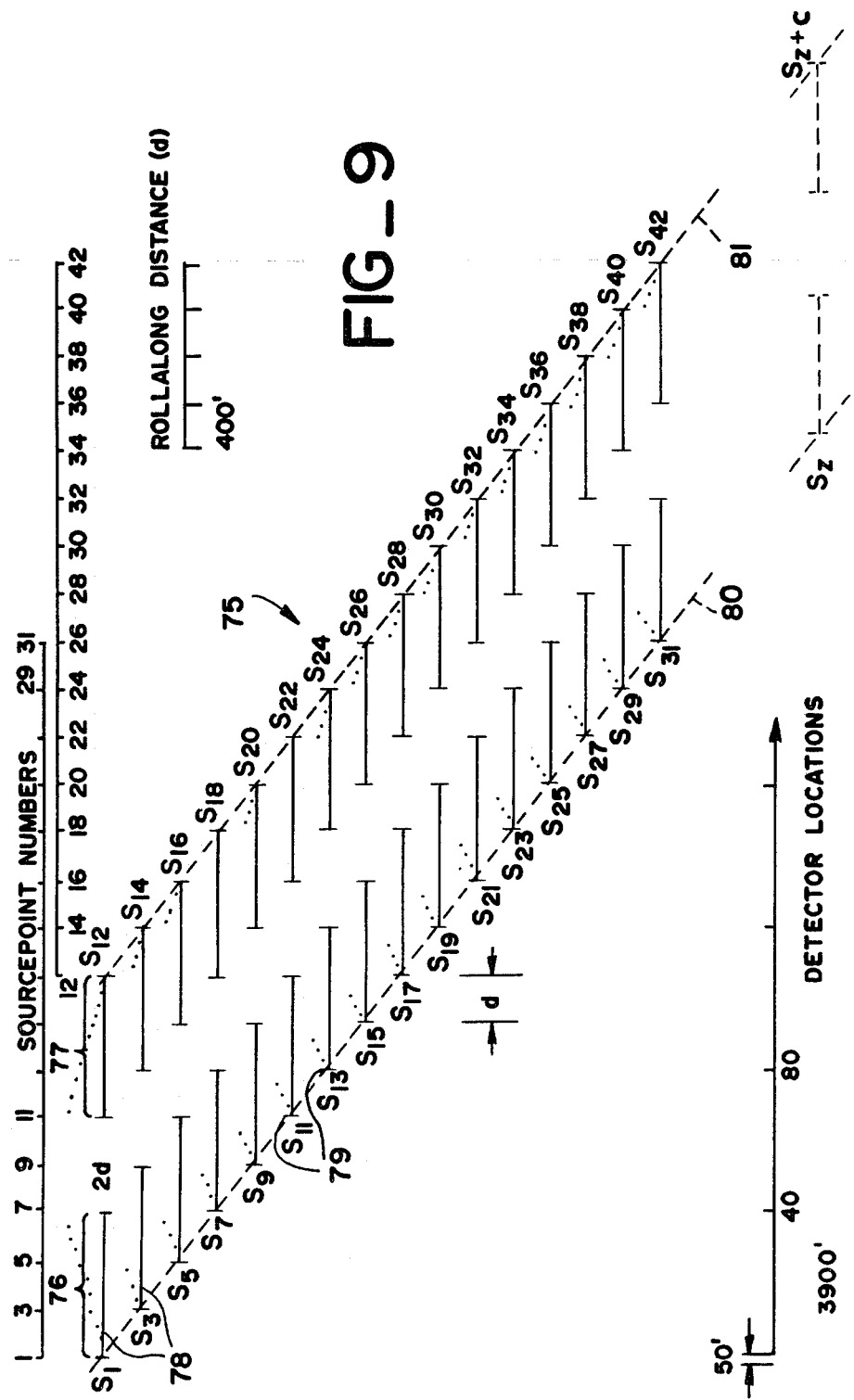

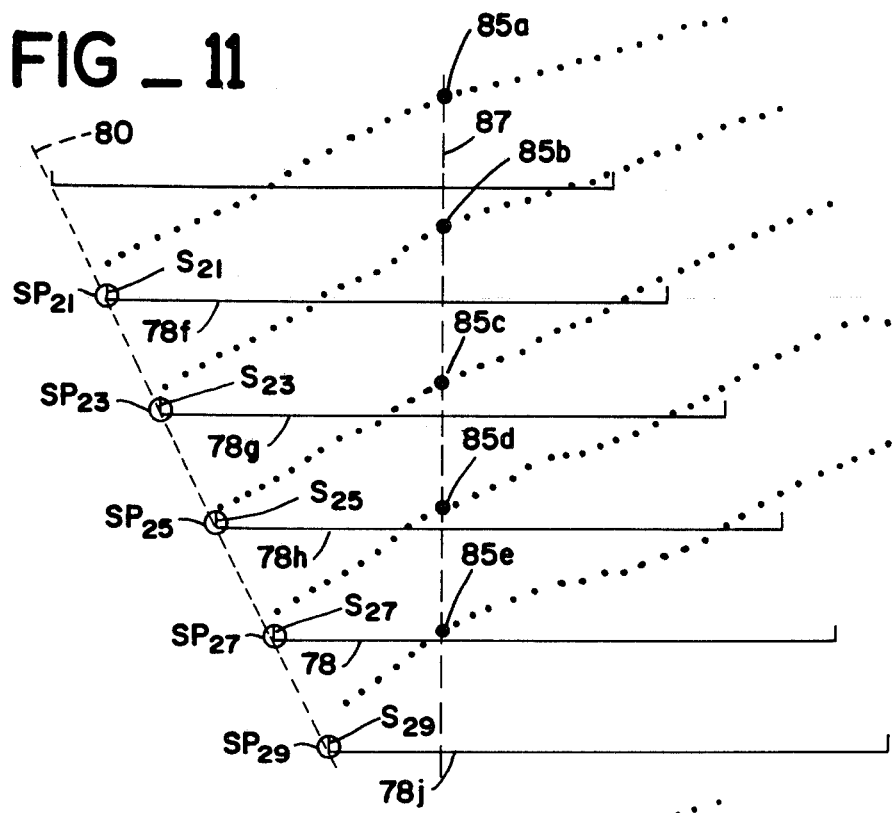
FIG_11
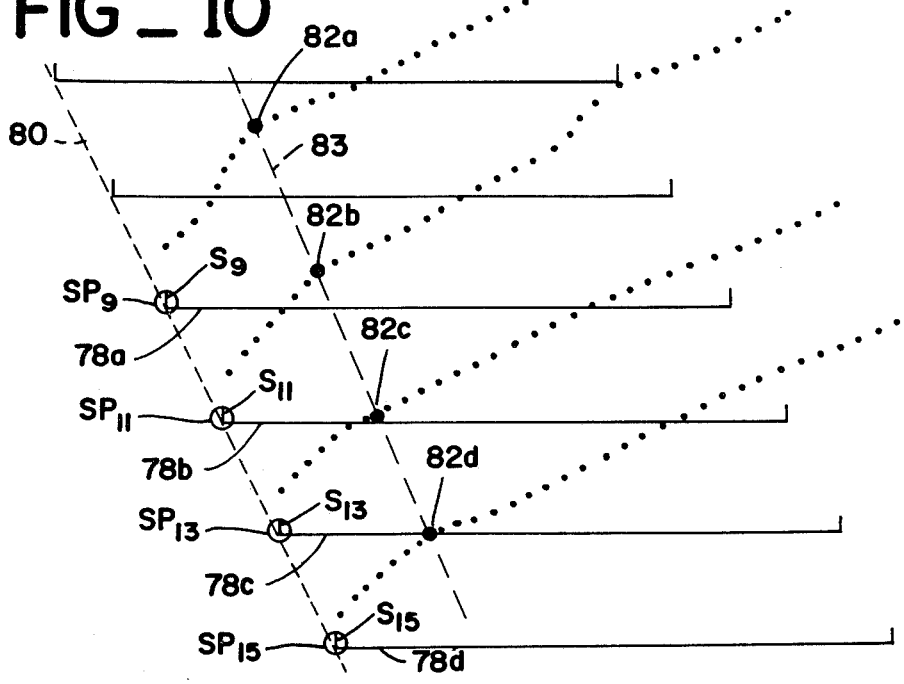
FIG_10

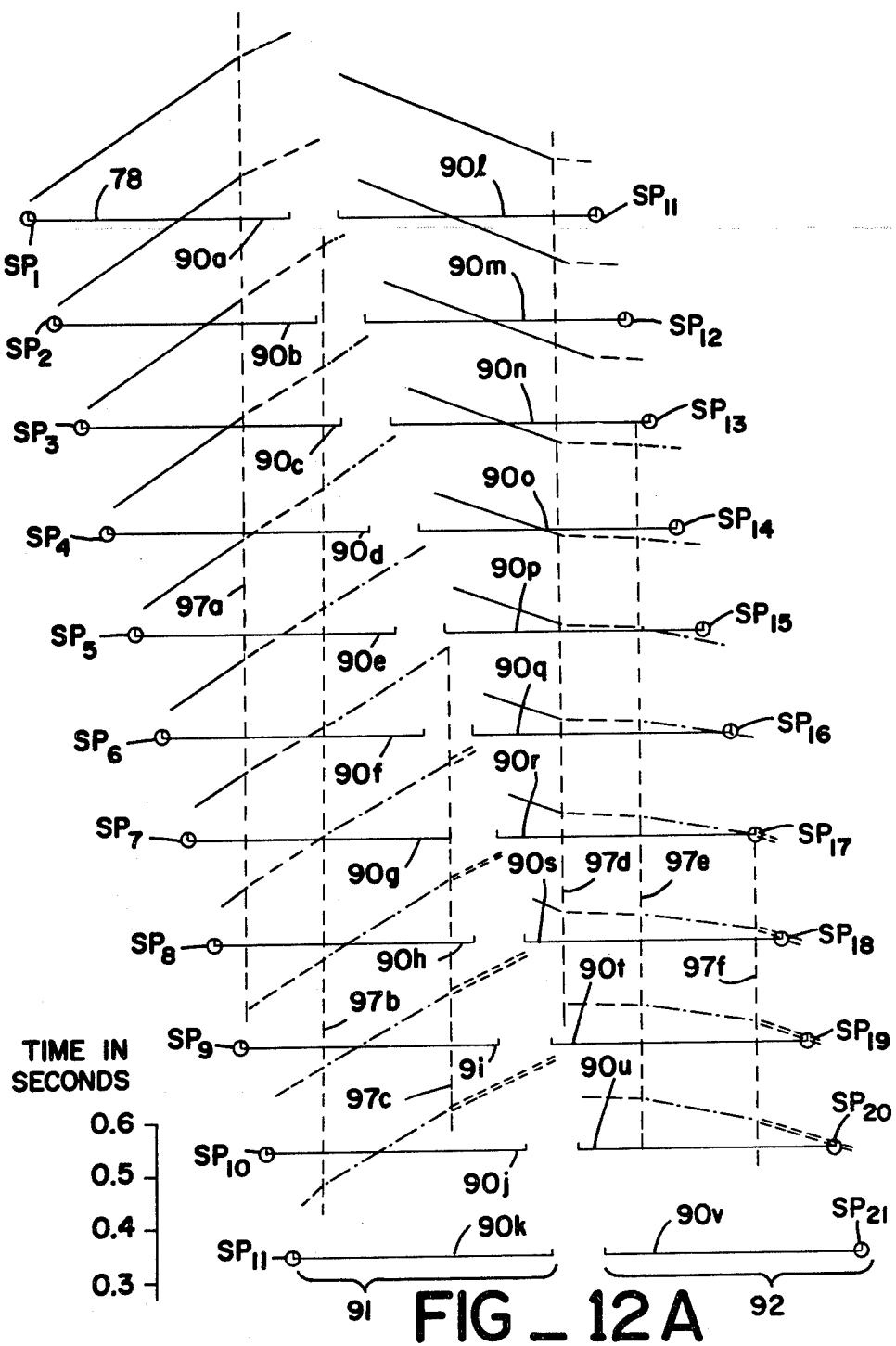
FIG_12A

LEGEND RELATED TO DEPICTED VELOCITIES

APPARENT COMPRESSION VELOCITY (FT/SEC)

"FORWARD" H-BARS 90a - 90k

|  |  |  |
|---|---|---|
| SOLID LINE | (———) = | 11,881 |
| BROKEN LINE | (— — —) = | 14,285 |
| DASHED LINE | (—·—) = | 12,121 |
| DOUBLE DASHED LINE | (===) = | 17,647 |

"REVERSE" H-BARS 90l - 90v

|  |  |  |
|---|---|---|
| SOLID LINE | (———) = | 20,339 |
| BROKEN LINE | (— — —) = | 130,000 |
| DASHED LINE | (—·—) = | 60,000 |
| DOUBLE DASHED LINE | (===) = | 23,076 |

FIG_12B

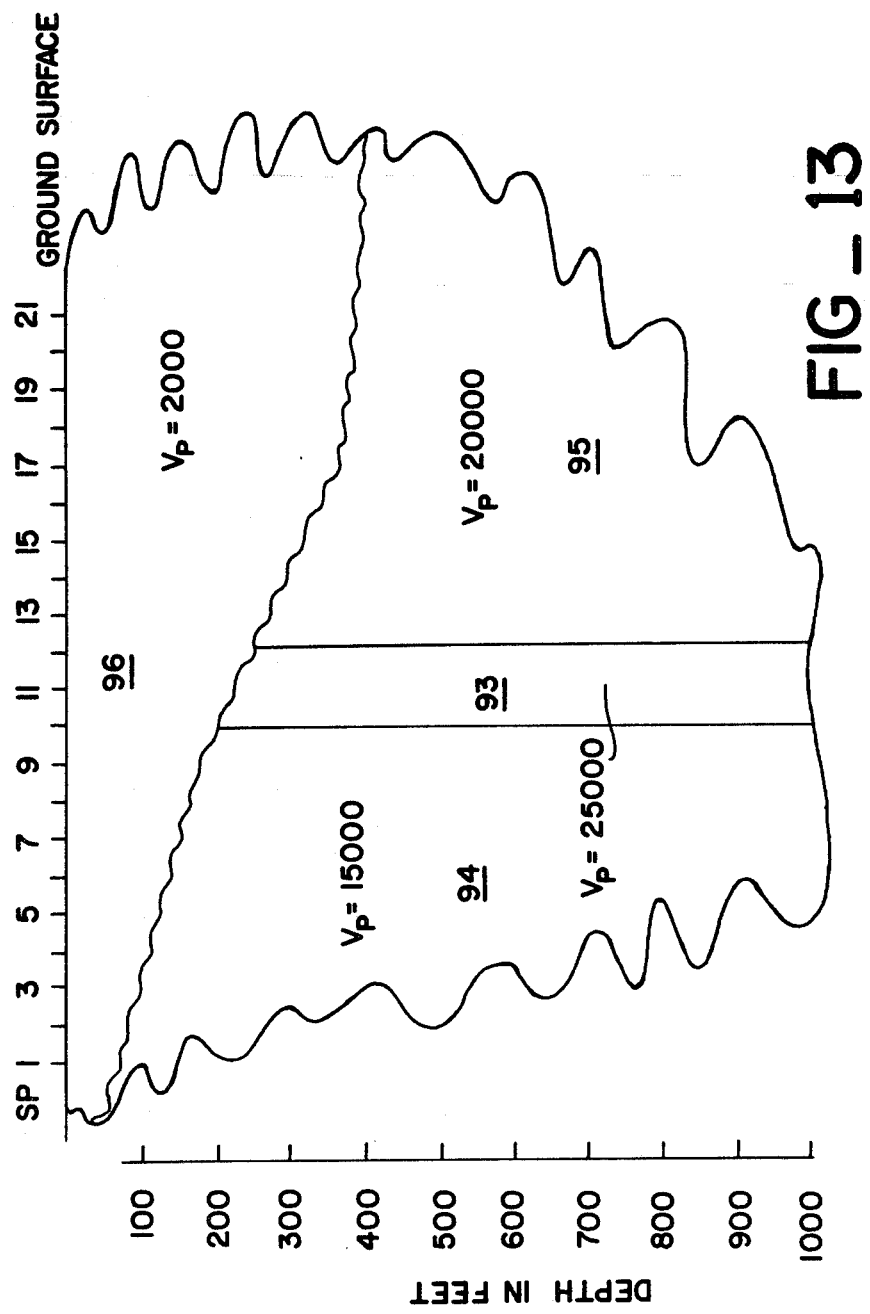

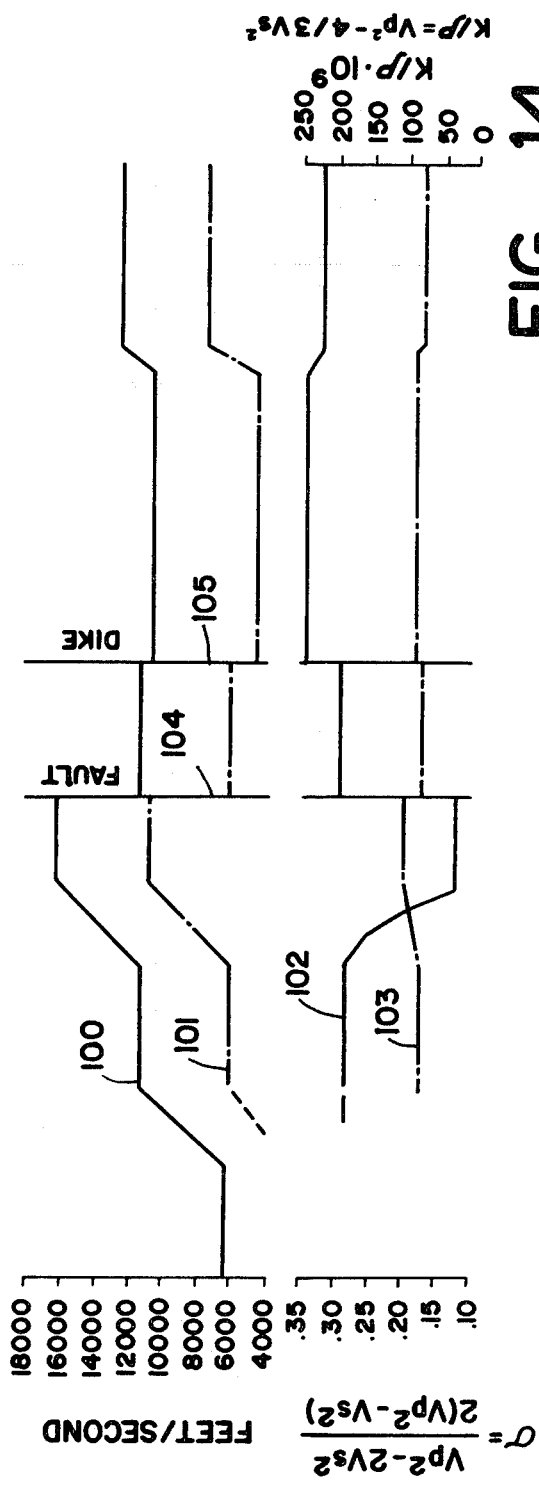
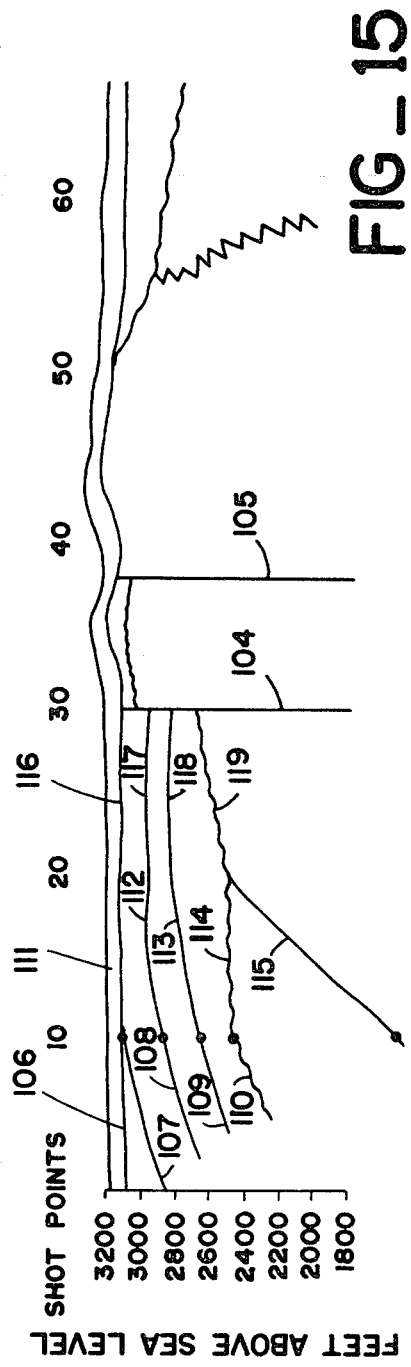
FIG_14
FIG_15

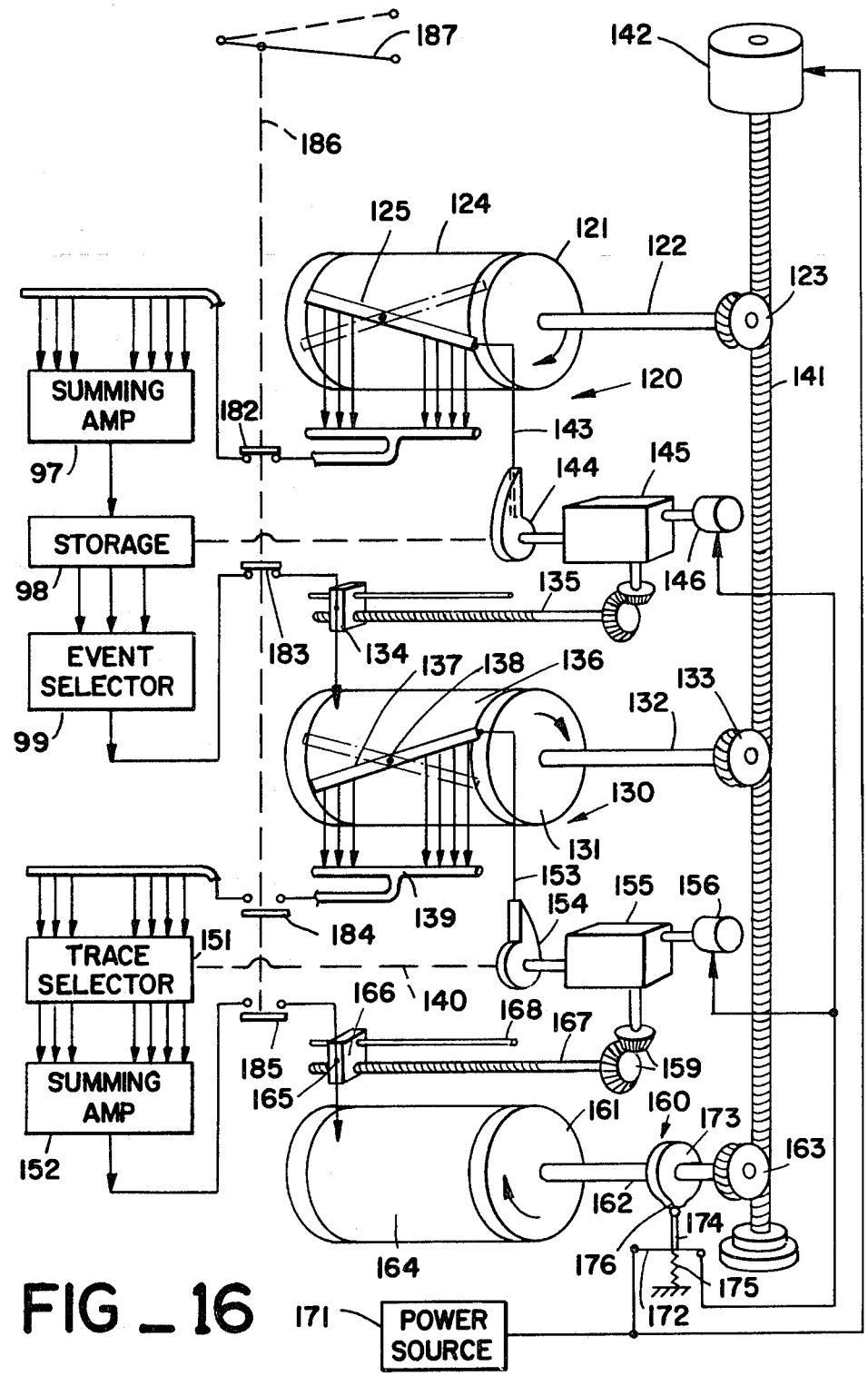
FIG_16

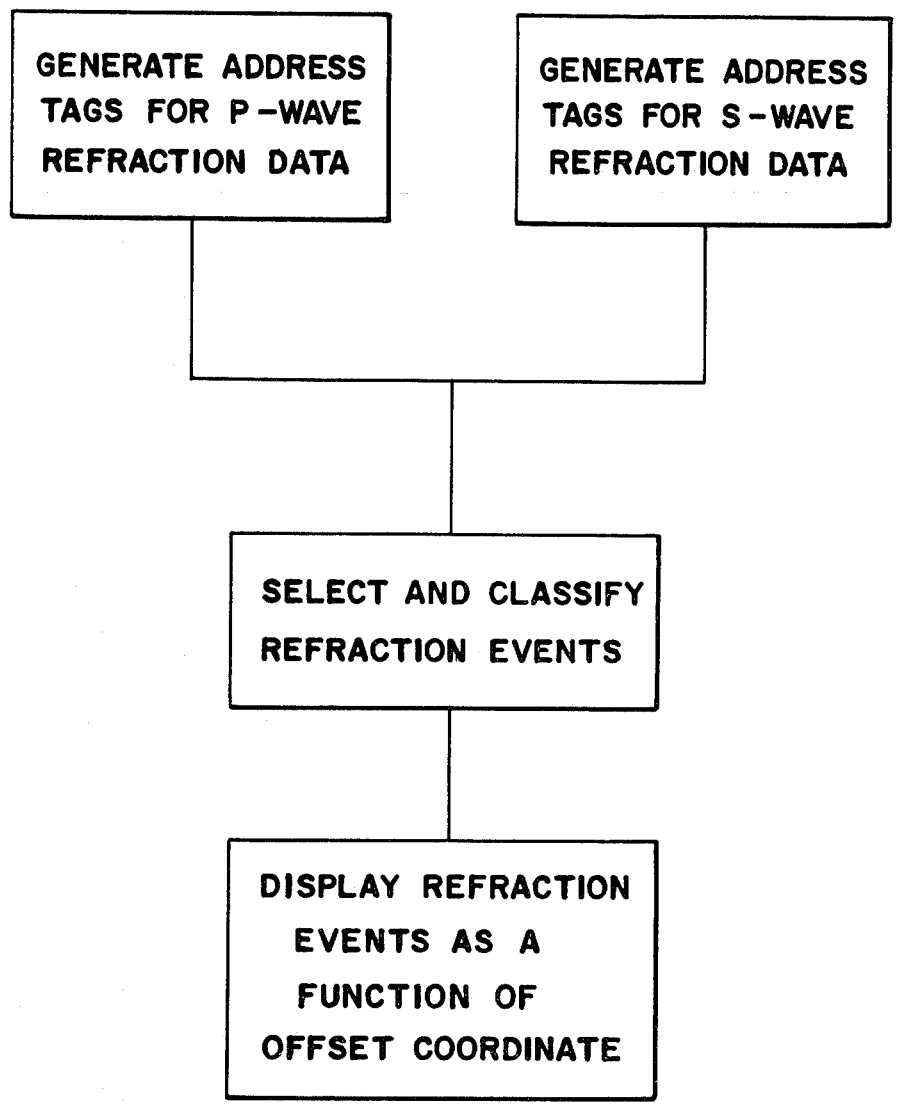
FIG_17

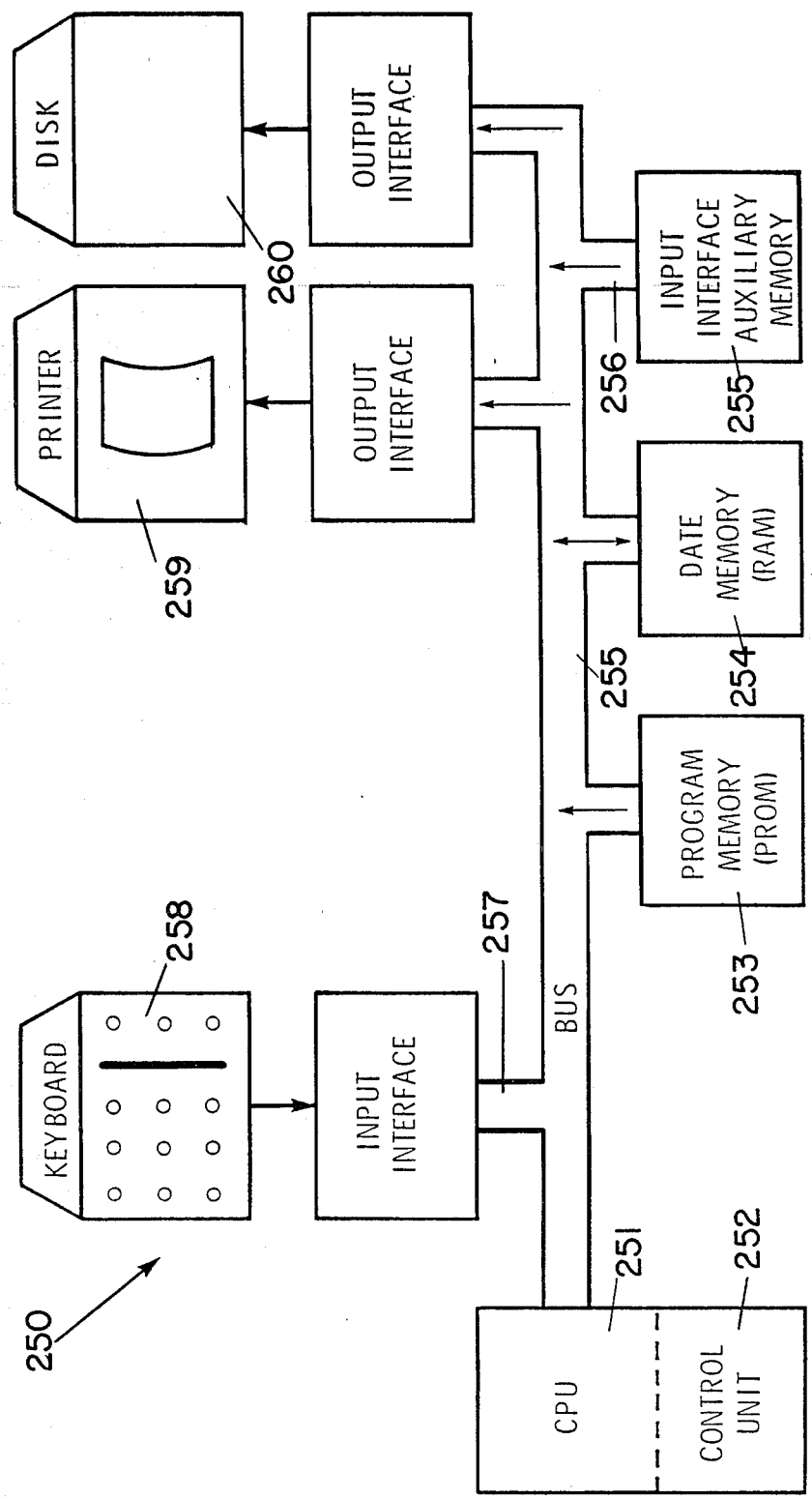
FIG_18

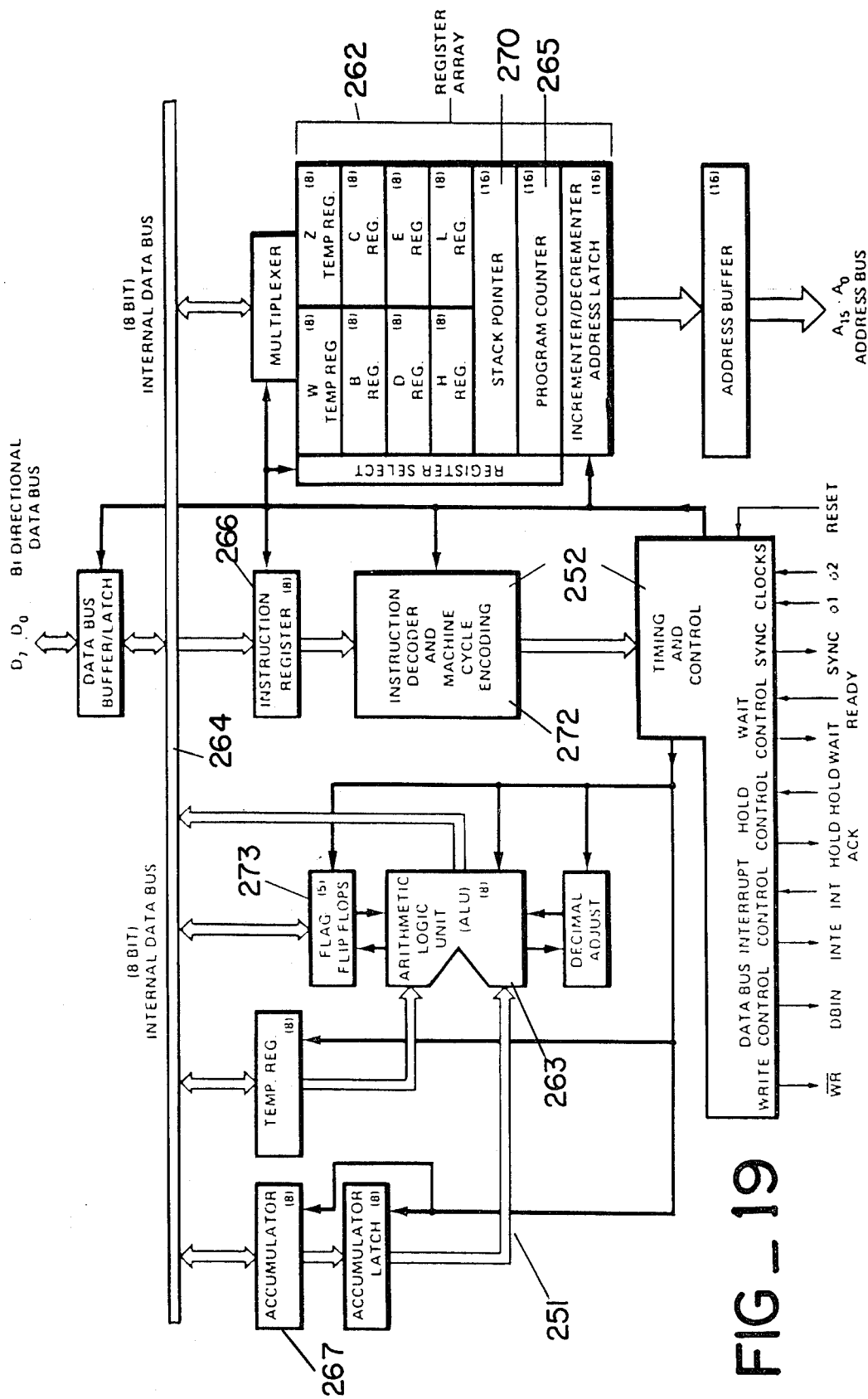
FIG_19

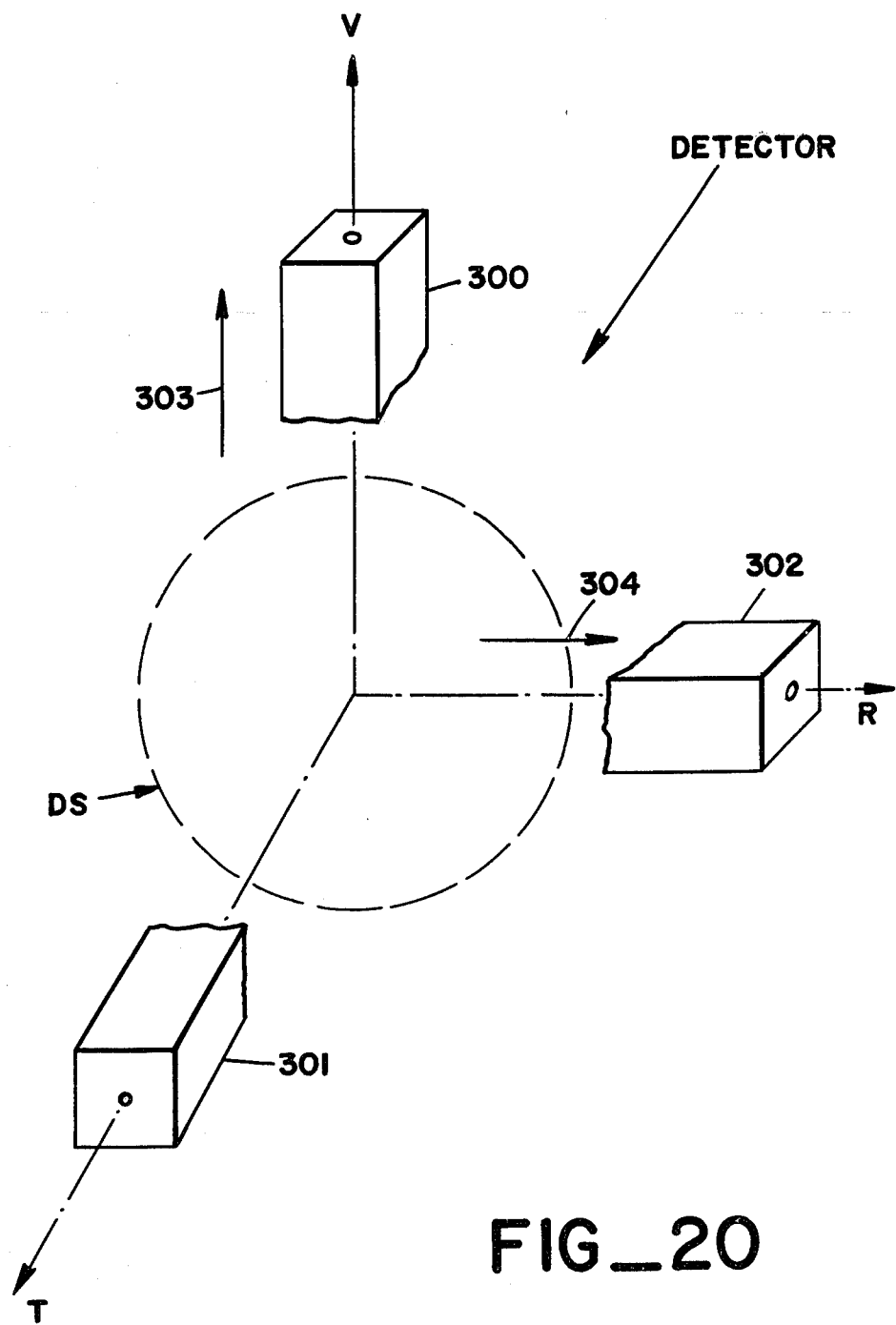
FIG_20

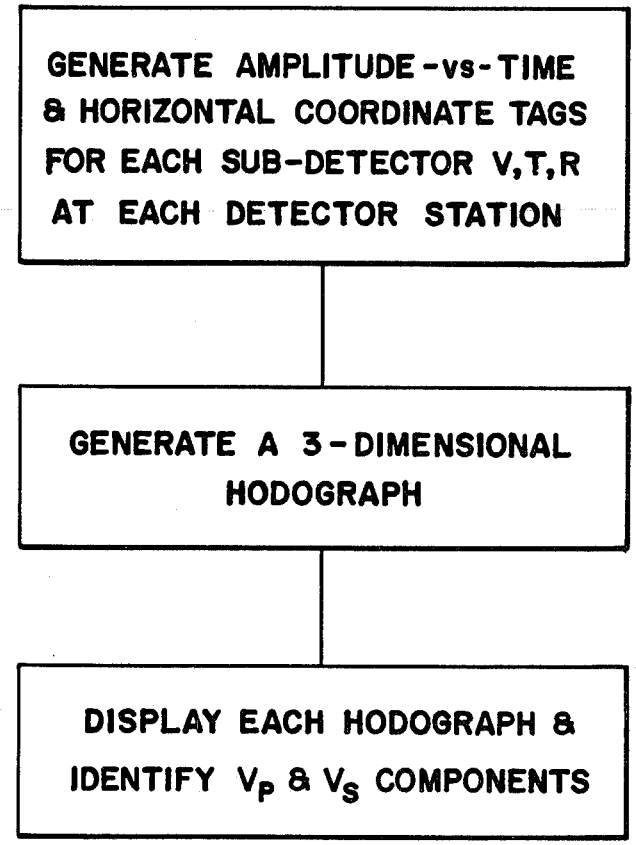
FIG_21
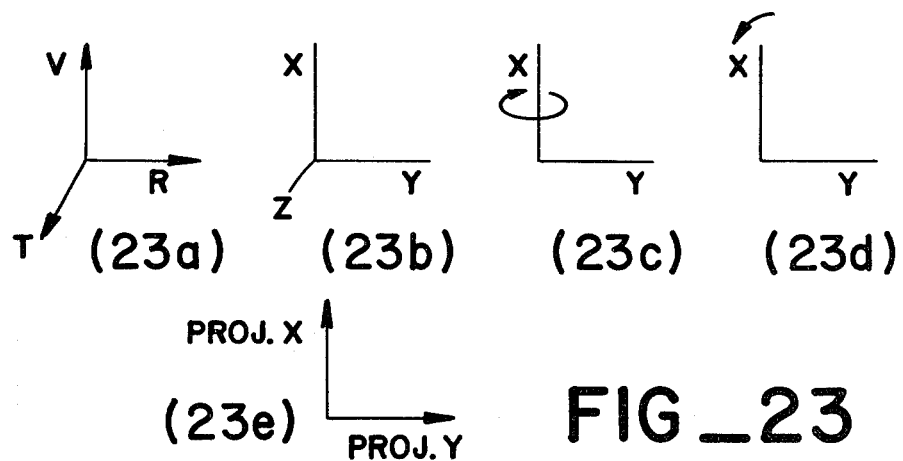
FIG_23

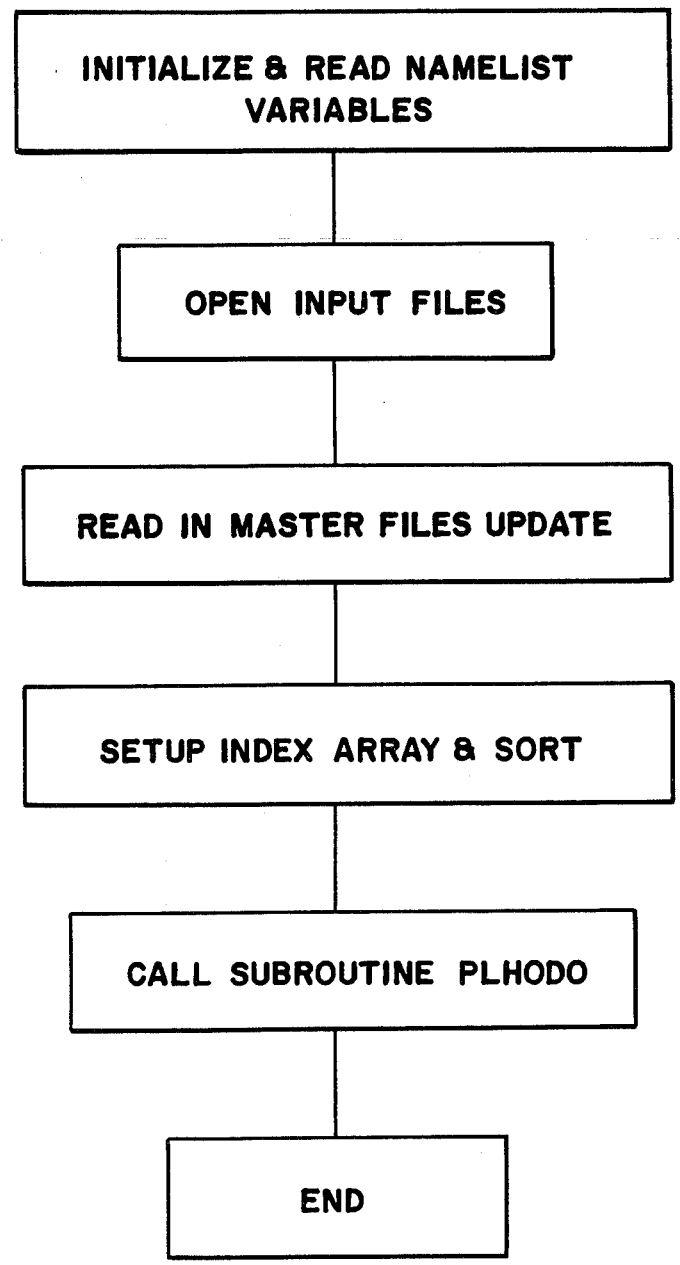
FIG_22

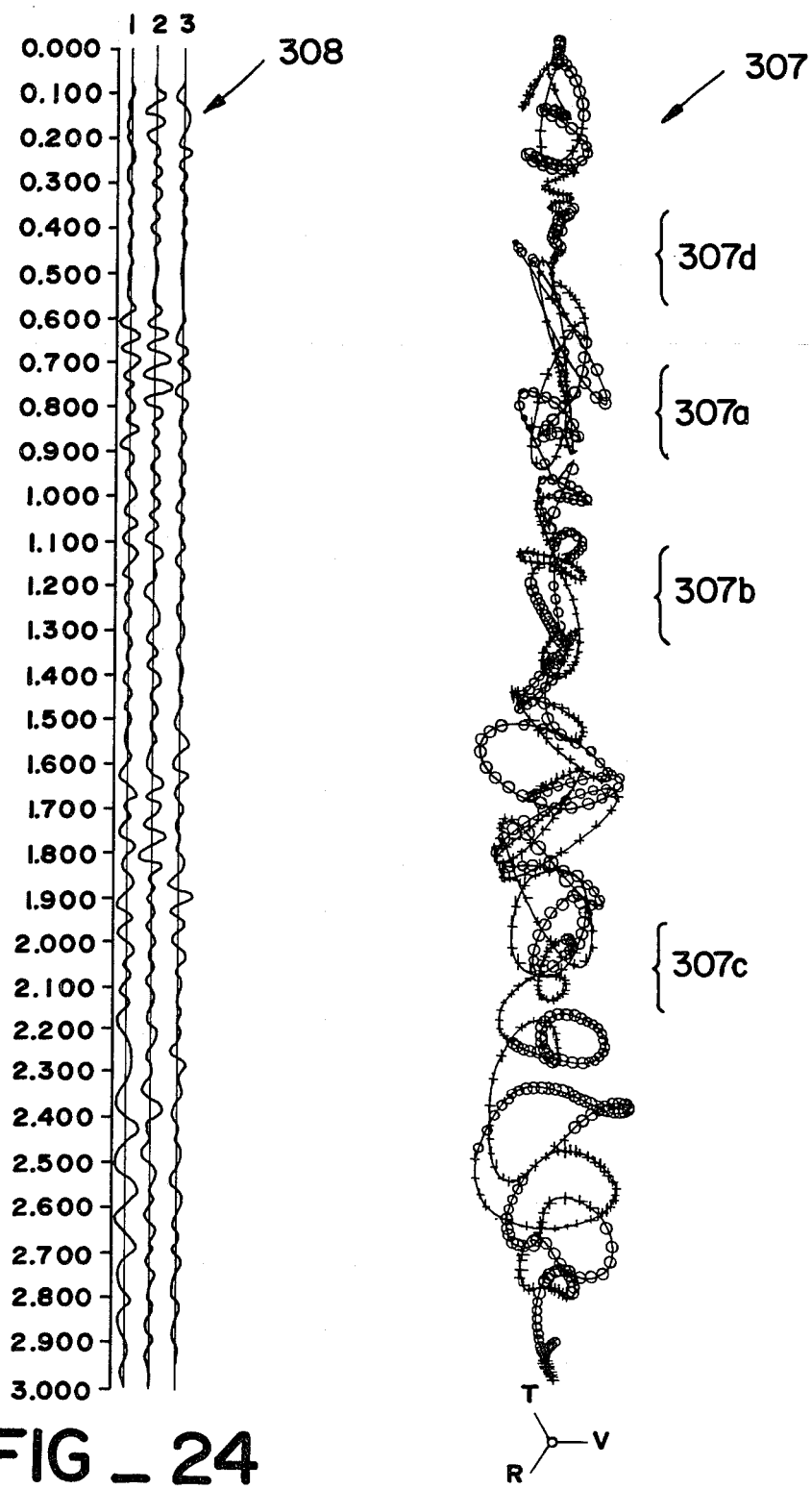
FIG_24

EXPLORATION SYSTEM AND METHOD OF DETERMINING ELASTIC PARAMETERS AND SUBSURFACE SHAPE OF AN EARTH FORMATION SO AS TO INDICATE LIKELIHOOD OF THE FORMATION BEING AN ORE, MARKER ROCK, ECONOMIC MINERAL OR THE LIKE

RELATED APPLICATION

This is a continuation of Application Ser. No. 952,887 filed Oct. 8, 1978, now abandoned, which is a continuation-in-part of application Ser. No. 238,503 filed Feb. 26, 1981 abandoned entitled "Exploration System for Discovering Deposits of Ore, Marker Rock and/or Economic Minerals", Gary S. Gassaway, Henry J. Richgels and James I. Foster.

SCOPE OF THE INVENTION

The present invention relates to the exploration for deposits of ore, marker rock and economic minerals in the shallow crust of the earth using seismic exploration techniques, and more particularly to mapping the shallow crustal earth formation by means of refractive seismic waves separated by a computer-dominated 3-D hodograph process into shear and compressional responses, to identify structure as well as elastic parameters of the strata undergoing survey.

In this application several terms are used and are defined as follows: the term "hodograph" means a plot of particle motion in three-dimensional polar coordinate units as a function of time; the term "marker rock" means rock that identifies ores, economic minerals, metallic and non-metallic minerals and/or minerals or rocks capable of supporting and/or at one time containing steam or water at elevated temperatures. The term "ores" means rocks and minerals that can be recovered at a profit, and includes not only metals and metal-bearing minerals, but also a plurality of non-metallic minerals such as sulfur and fluorite. The definition may also be rock containing small amounts of useful minerals or may be rocks in a massive ore-bearing strata. The term "economic minerals" includes concentrations sufficient to allow economic recovery and/or are in a form that permits economic recovery such as building stones, industrial materials (abrasives, clays, refractories, light-weight aggregates, and salt), and includes the term "ore minerals" (compounds valued for their metal content only) within its definition.

BACKGROUND OF THE INVENTION

Accelerating growth of the world's population, combined with improved standards of living throughout the world, have greatly increased demand for all types of mineral products. At the same time, there have been attempts to shift to alternate sources of energy such as to use steam or water at elevated temperatures in situ for driving compressors and the like. Such geothermal reservoirs are likewise being sought for the same reasons described above and are usually in association with deposits which can be designated as "marker rocks". Unfortunately the contrast between physical properties of economic ore minerals and country or host rock surrounding them are not well defined by conventional surface exploration techniques. In zones of interest, whether an anomaly of interest is from a valuable ore, mineral, etc., or from some other associated rock material having no economic importance, is a most difficult question to answer. This is primarily due to the fact that ore, economic mineral and marker rock deposition are under cover and cannot be observed at the earth's surface.

In oil and gas exploration, seismic refraction shooting has been well known and practiced for decades. But because resolution of events is limited in the vertical direction to shallow structures, crews performing refraction shooting have not used arrays having severely overlapping inline positions. Additionally applicability in the exploration sense of such a refraction technique, say, for discovery of new deposits of ore, marker rock and economic minerals, did not exist. Heretofore, in such refraction shooting, as reported in the book, "Introduction To Geophysical Prospecting", M. B. Dobrin, 2nd Ed., McGraw-Hill, 1960, the detector positions are usually designated $X_1, X_2 \ldots X_n$, with the shot point and detector positions being positioned to provide end-shooting sequences only. Successive shots at uniform or almost uniform intervals, adjacent to the ends of detector spreads, say, adjacent to the near detector position $X_1$ and the far detector position $X_n$, provide source waves. Then the detector spread is advanced; its new end position $X_1'$ becomes superimposed on the $X_n$ position of the prior spread. In that way, provision can be made for a "tie point" from refraction record to refraction record but not for systematically associating at least two traces with each inline position along the line of survey.

SUMMARY OF THE INVENTION

The present invention has been surprisingly successful in indicating deposits of ore, economic minerals and marker rock in the earth's crust. A key to intrepretation: extremely accurate resolution of refraction compression versus shear wave responses using a computer-dominated 3-D hodograph process. Such resolution uses techniques that are both practical and economic, to allow accurate identification of the shape of surveyed strata as well as to allow extremely accurate assessment of their seismic shear and compressional wave velocities as a function of depth.

In accordance with the present invention, resolution of refractor shape uses data provided by a field system that utilizes a "roll-along" technique of shifting source and detector arrays along a line or lines parallel with the line of survey whereby the resulting refracted seismic data can be systematically indexed to offset position. Preferred construction of the sources and detectors: each source is preferably a line source of dynamite, while the detectors are preferably 3 component detectors which provide outputs proportional to deviations in vertical and horizontal directions at the earth's surface, although single direction (vertical) detectors can also be used, in accordance with collection aspects of the present invention. During collection, an array of sources and detectors is advanced in selected increments along the line of survey, with the resulting refraction data processable to discern compressional from shear wave responses, to provide overlapping stackable displays indexed to common inline position and to refraction travel direction.

Data patterns can be classified so that: (1) velocities of the shear and compressional waves can be accurately indicated via 3-D hodographs; and (2) there is an indication of the shape of the strata under survey based on posted P-wave or S-wave breaktimes.

Ultimately, a final depth display of the refractor bed segments annotated with shear and compressional wave velocities as well as Poisson's ratio can be provided, such display being highly indicative of deposits of ore, marker rock and/or economic minerals in the refractor beds, especially if vertical dikes are shown.

SPECIFIC DESCRIPTION OF THE DRAWINGS

FIG. 1 is a schematic section of an earth formation illustrating the mechanism of transmission of refracted seismic waves;

FIGS. 2 and 3 are time-distance and ray path plots respectively for the earth formation of FIG. 1;

FIGS. 4A, 4B and 4C are schematic diagrams of wave propagation within solids to illustrate compressional waves, shear waves and Rayleigh waves, respectively.

FIG. 5 is a schematic diagram of an array of sources and detectors positionally arranged along a line of survey in which the sources and detectors are incrementally moved along the lines of survey to provide higher resolution of refracting interfaces, such advancement being analogous to a "roll-along" technique conventional in reflection seismology;

FIG. 6 is a perspective view of a seismic source used in the array of FIG. 5;

FIG. 7 is a refraction record shot in opposite directions using the array of FIG. 5;

FIG. 8 is a schematic diagram of equipment useful in carrying out the present invention;

FIGS. 9, 12A and 12B are plots of data provided in the array of FIG. 5 transformed in accordance with the teachings of the present invention;

FIGS. 10 and 11 are details of the plot of FIG. 9;

FIG. 13 is a depth plot constructed from the plot of FIG 12;

FIGS. 14 and 15 are typical final displays in accordance with the teachings of the present invention;

FIGS. 16, 17, 18 and 19 relate to modified forms of the present invention;

FIG. 20 is a partially schematic diagram of a 3-component detector useful in the array of FIG. 5 for distinguishing compressional and shear wave responses at the detector stations $DS_1$, $DS_2$... etc., in accordance with a modified aspect of the present invention;

FIGS. 21 and 22 are flow charts of a computer-dominated process for distinguishing the compressional and shear wave responses of the detector of FIG. 20;

FIG. 23 is a typical plot provided by the modified method of FIGS. 21 and 22.

DESCRIPTION OF THE PREFERRED EMBODIMENT OF THE INVENTION

In order to understand certain aspects of the invention a brief review of the history of refraction semismolgy is in order and is presented below.

FIG. 1 illustrates the mechanism for transmission of refracting waves in an earth formation 9.

In FIG. 1 the formation 9 consists of a two-bed model, i.e., beds 10 and 11, each with homogeneous and isotropic elastic properties. Upper bed 10 is separated from the lower bed 11 by horizontal interface 12. The upper bed 10 has a velocity less than that of lower beds 11, i.e., the beds increase in velocity as a function of depth. The surface 13 of the formation 9 is separated from interface 12 by a depth z. Compressional velocity of the seismic wave in the upper bed 10 is assumed to be $V_0$ while the compressional velocity in the lower bed 11 is $V_1$. If a seismic wave is generated at point S, the energy travels with hemispherical wavefronts through bed 10. Detector 14 is placed at point D, at the earth's surface 13, a distance X from S; the wave traveling horizontally through upper bed 10 reaches the detector 14 before any other wave (if X is small). For large values of X, the wave traveling along the top of the lower bed 11 (having a higher speed $V_1$) overtakes the direct wave, however. The mechanism by which energy is transmitted from S to D along the indirect paths SA, AB, and BD has been analyzed mathematically. Briefly, when the spherical wavefronts from S strike the interface 12 the velocity changes and energy is refracted into the lower bed 11 according to Snell's law. At some point A on the wavefront, the tangent is a sphere in the lower bed 11 and is perpendicular to the boundary interface 12. The ray corresponding to this wavefront now begins to travel along the interfce 12 with the speed $V_1$ of the lower bed 11. By definition, the ray SA strikes the interface 12 at the critical angle. In FIG. 1, the wavefronts below the interface 12 travel faster than those above. The interface 12 is subjected to oscillating stresses. As a consequence, continuous new disturbances are generated along interface 12 spreading out in the upper bed 10 with a speed $V_0$. The spherical waves adjacent to point B in the lower bed 11 travel a distance BC during the time the wave in the upper bed 10 attains a radius of BE. The resultant wave front above the interface 12 follows the line CE, making an angle $i_c$ with the boundary interface 12 in accordance with the following equations:

$$\sin i_c = \frac{BE}{BC} = \frac{V_0 t}{V_1 t} = \frac{V_0}{V_1}.$$

The angle ($i_c$) which the wavefront makes with the horizontal is the same as the ray makes with the vertical so that the wavefront will return to the surface at the critical angle ($\sin^{-1} V_0/V_1$) with respect to the vertical.

FIGS. 2 and 3 illustrate time-distance and ray path plots of data associated with the earth formation 9 of FIG. 1.

In FIG. 3, the wave is seen to travel along paths $AB$-$BC$-$CD_2$ and $AB$-$BC$-$C'D_3$. In FIG. 2, a distance called the "critical distance $X_c$" is shown, and is defined as the distance measured from the shot point to intersection 15 of linear segments 16 and 17. Note with respect to FIGS. 2 and 3 that a direct wave can travel from point A to a detector at a speed $V_0$, so that $T=X/V_0$. This is represented on the plot of the T-vs.-X in FIG. 2 as straight line segment 16 which passes through the origin and has a slope of $1/V_0$. At distances less than the critical distance $X_C$, the direct wave reaches the detector first. At greater distances, the wave refracted by the interface arrives before the direct wave since it has been previously shown that the wave that travels fastest from point A to points $D_2$ or $D_3$ approaches the interface 12 at the critical angle and propagates horizontally along the interface 12 with the speed $V_1$ of lower bed 11 and returns to the surface 13 at the critical angle, i.e., along paths $ABCD_2$ and $ABC'D_3$ of FIG. 3.

From FIGS. 2 and 3, the following equations can be derived:

$$\sin i_c = V_0/T_1; \tag{1}$$

$$T = X/V_1 + 2Z/V_1{}^2 - V_0{}^2/V_1V_0; \text{ and} \tag{2}$$

$$T_i = 2Z/V_1{}^2 - V_0{}^2/V_1V_0, \tag{3}$$

where

T is the total time along the ray path of interest and $T_i$ is the intercept time of the time-distance plot.

While FIGS. 1–3 deal with compressive seismic wave propagation within the earth, similar plots explain the travel of transverse or shear waves within the earth. In order to understand the differences as well as similarities of these types of waves, reference should now be made to FIGS. 4A, 4B and 4C. Before such discussion a brief explanation of elastic waves is in order and is presented below.

Briefly, the simplest type of elastic wave propagation in a homogeneous, isotropic infinite elastic medium consists of alternating condensations and rarefractions in which adjacent particles of solid are moved closer together and then farther apart. If a pressure is suddenly applied to a medium at a point source, the region within the material of the medium that is most compressed will move outwardly from the disturbance, the disturbance having a radius increasing at a rate determined by the elastic properties of the medium.

In FIG. 4A the wave has a direction of particle motion that is the same (or at an angle of 180°) as the direction of wave propagation. Such waves are referred to as compressional or P-waves. The speed of the compressional waves is related to the elastic constants and density of the medium in a well-known manner.

In FIG. 4B, the particle motion within the transmitting medium is at right angles to the direction of the wave propagation. Since the deformation is essentially a shearing motion, such waves are often referred to as "shear waves". The velocity of any transverse waves also depends on the elastic constants and the density of the medium.

Rayleigh waves of FIG. 4C are waves travelling along a free surface of any elastic solid. The particle motion (in a vertical plane) is elliptical and retrograde with respect to the direction of propagation. Amplitude decreases exponentially with depth. The speed is slower than P-waves or S-waves, and can vary when a low-speed surface layer overlays a much thicker material.

Having now established a firm theoretical foundation for the invention, the latter will now be described below with reference to FIG. 5.

In FIG. 5, an array 20 of detectors $D_1$, $D_2$ . . . is aligned along a parallel line 21, designated "the line of survey" of the array. Each detector can be provided with the ability to discern shear waves, and compressional waves through the use of a three-component system of response. By the term "three-component" is meant that one or more of separate detectors is provided with the capability of detecting vibrations in two directions in the horizontal plane and in a single direction along the vertical axis. In that way, electrical signals associated with the "three components" can be transmitted via cable array 22 to recorder/storage unit 26, as separate signals for further processing as discussed below.

Sources $S_1$, $S_2$ . . . etc. of seismic waves are placed as sourcepoints $SP_1$, $SP_2$ . . . etc. adjacent to end detector positions $DS_1$, $DS_{40}$ . . . etc. Sequential shots can be taken at each end.

FIG. 6 illustrates a typical source. It consists of dynamite cylinders 23. A group of cylinders of dynamite, say, nine, may be formed into 3 separate longitudinally aligned segments 24a, 24b and 24c such that the axis of symmetry of each is substantially perpendicular to the earth's surface and parallel to each other. Within each segment, contact between each group of the three cylinders 23 is along substantially parallel lines. Each group of three cylinders of each segment 24a–24c provides three separate lines of contact in a "closest packing order" arrangement; that is to say, each cylinder 23 is in-line contact with the remaining members of each group along an exterior wall thereof. The source is activated via a dynamite cap conventional in the art.

Returning to FIG. 5, the detectors $D_1D_2$ . . . etc. are positionable at a series of stations, such as detector stations $DS_1$, $DS_2$. . . etc. When the sources are located at the sourcepoints $SP_1$ and $SP_2$, and when sources therein are energized in sequence, the refraction data that are produced are capable of being indexed to detector positions $DP_1$, $DP_2$. . . etc. at the recorder/storage unit 26.

Since spacing between adjacent detector stations $DS_1$, $DS_2$ . . . etc. and source points $SP_1$, $SP_2$, $SP_3$ . . . etc. determines the resolution pattern of the array, the closer the spacing, the better the dip resolution. And the longer the array, the greater the depth resolution. Offset positions of detector and sources in a typical field arrangement are as indicated in FIG. 5. Preferred spread length: 3900 feet. In-line spacing of detectors: 100 feet. In-line spacing of the sources with respect to the detector spread: 50 feet. Variations, of course, occur depending on the many factors indicated above.

Recorder/storage unit 26 connects to the outputs of the detectors through cable array 22 and other appropriate signal processing circuits (not shown) which can include indexing and recording address means. The latter annotates the positions—in the field—of the seismic source producing the energy (viz., the source at each sourcepoint $SP_1$ or $SP_2$ . . . etc., as well as the detector stations receiving the refracted energy, viz. stations $DS_1$, $DS_2$ . . . etc. In operation, after activation of sources $S_1$ and $S_2$ at sourcepoints $SP_1$ and $SP_2$, data records are produced at the detector stations $DS_1$, $DS_2$ . . . etc. Thereafter, the array is advanced in the direction of arrow 29; that is to say, the array of FIG. 5 is "rolled forward" whereby station $DS_1$ is advanced to station $DS_5$ with appropriate relocation of the remaining detectors at original stations $DS_6$, $DS_7$ . . . etc., occurring. After new sources $S_3$ and $S_4$ at the sourcepoints $SP_3$ and $SP_4$ are energized, and seismic energy is received at the detector stations $DS_5$, $DS_6$ . . . etc., a new field data record is generated at recorder/storage unit 26. It should be noted in FIG. 5 in this regard that the detector stations, $DS_5$, $DS_6$ . . . etc., define common offset positions so that indexing of the refraction location data as a function of offset position at the recorder/storage unit 26 is a somewhat firm requirement. In this regard, efficiency of the "roll-along" technique can be somewhat enhanced by using a roll-along switch such as described in U.S. Pat. No. 3,618,000, issued Nov. 2, 1971, for "Roll-along Switch" and assigned to the assignee of this application.

Data addressing is also a function of the nature of the detector positioned at stations $DS_1$, $DS_2$, etc. Assume at each detector station $DS_1$, $DS_2$ . . . etc., e.g., the transverse component output of each three-component detector is used, independently, to measure shear wave response. Similarly, the vertical component output of the same three-component detector can be recorded, directly, as the compressional wave response. Hence, processing and addressing problems can be lessened.

As previously described, separate outputs of each detector measure velocity of the displacement (movement) of the earth's surface in three directions: (i) vertical displacement; and (ii) two horizontal displacements at right angles to each other. The former measures P-wave response; the latter relate to S-wave response. Hence, three-component detectors are preferred as array detectors under usual circumstances. However, it should be noted that it is possible to use a single vertical component detector under selected circumstances. Also a combination of both types is possible, i.e., a 3-component detector can be used at the stations $DS_1$, $DS_5$, etc. in conjunction with conventional vertical detectors in between, i.e., at stations $DS_2$, $DS_3$, $DS_4$, $DS_6$, etc.

Recorder/storage unit 26 can record and/or store the P-wave and S-wave data in separate data files in analog or digital formats with such signals being convertible either at the field site or at a remote location to conventional side-by-side wiggle trace records. The data can also be annotated as to the directions that the refractions were received, i.e., the data can be associated with a source at a leading or at a trailing position with respect to the detector spread.

FIG. 7, illustrates a typical record 27 of record/storage unit 26.

As shown, timing marks are designated above the top of the pair of records 27a and 27b, and indicate that the first wave arrived about 1.75 seconds after the explosion of the source. The first arrivals are indicated by a pronounced rise in amplitude after which the traces remain disturbed, each arrival being characterized by an upkick followed by a peak and a subsequent trough. From the moveouts the apparent velocity can be calculated. In the present invention, first-event refraction shooting is utilized, as are second- and third-event refraction events.

In order to indicate intercept times—and hence true velocities—the shape of the underlying strata including dip of the bedding interfaces must be taken into account.

For example, consider that the refractions of a given record have respective speeds of $V_0$ and $V_1$ and an interface dipping at a particular angle alpha between first and second beds, see FIG. 1. If $Z_d$ is defined as the perpendicular distance from shot to the interface at the up end of the line and $Z_u$ is the perpendicular distance from shot at the downdip end of the line, then the following formulas described the refraction travel times for such a geometry.

$T_d$ (total time shooting downdip) =

$$\frac{2Z_d \cos i_c/V_0}{V_0} + \frac{X}{V_0} \sin(i_c + \alpha)$$

$T_u$ (total time shooting up-dip) = $\frac{2Z_u \cos i_c}{V_0} + \frac{X}{V_0} \sin(i_c - \alpha)$ If the refracting interface is horizontal, however, the actual depths are easily calculated as follows:

(Two layer case) $Z$ (depth) = $\dfrac{t_i V_1 V_0}{2\sqrt{V_1^2 + V_0^2}}$ (Three layer case) $Z_1 =$ -continued $$\tfrac{1}{2}\left(t_i^2 - 2Z_0 \frac{\sqrt{V_2^2 - V_0^2}}{V_2 V_0}\right) \frac{V_2 V_1}{\sqrt{V_2^2 - V_1^2}}.$$

But if there is dipping, further refinements must be made, as suggested above, before the depths of the dipping beds can be determined, as set forth in Dobrin, op. cit.

PROCESSING

After collection, processing of the data is required. Object of such processing: to associate a series of travel time vs. offset plots of FIG. 7 with selected detector spreads of FIG. 5 to provide a guide to the shape of the strata under survey.

While various types of equipment of both an analog and digital nature can be used, the equipment of FIG. 8 has advantages of simplicity and low cost, and so is presented in detail below. Briefly, such processing utilizes either one of two data files: (i) a P-wave data file associated with results of a vertical component of each three-component detector of the field array, or (ii) an S-wave record associated with the horizontal component of the same detector of the same array.

In FIG. 8, separate magnetic recording and playback systems are illustrated at 33 and 36. While the method of the present invention could be performed with less apparatus than shown herein by physically moving records back and forth between recording systems, the process is more easily described and understood by referring to the two systems as shown. It should be understood that other combinations of the apparatus, as well as other types of recording, reproducing and data processing systems are contemplated. An example of other such combinations would be a properly programmed digital computer.

The magnetic recording system 33 constitutes a drum 34 supported on a rotatable drive shaft 35 driven by a suitable mechanism such as gear 37 through the worm shaft 38 and motor 39. Actual record processing in accordance with the present invention will require careful speed control for rotation of the systems 33 and 36, as well as synchronization between the rotation of the record drums and the movements of magnetic heads within each system. The drum 33 is adapted with conventional apparatus, not shown, for securing a record in the form of a magnetic tape 40 to the periphery of the drum. Separate scanners 44 and 45 are carried adjacent to drum 34. The tape 40 includes two sets of data: amplitude-vs.-time refraction data and a timing trace or marks associated with activation of the source. The tape 40 is scanned simultaneously by scanners 44 and 45 as a function of rotation of drum 34. Movement of scanner 45 also occurs along the drum 33. That is to say, after a single revolution of the drum 34, motor 41 is energized by apparatus to be described, to cause one step of movement of the scanner 45 in the lateral direction. Scanner 44 is not activated by the motor 41, however; instead it remains fixed at a known circumferential position relative to the drum 34.

It should be understood that different schemes may be employed to provide individual control for the movement of each of the heads. For example, the magnetic heads need not mounted on a simple bar, but instead can be mounted as separate members that are capable of individual circumferential movements around the drum. The bar-type mechanism is illustrated here for didactic clarity.

Scanner 45 is mounted on a threaded block 42 positioned by rotation of worm 43. The threaded block 42 is guided by a fixed rod 46 to prevent its rotation about worm 43. The worm 43 is driven from gear box 47 by a gear 48 and its engagement with gear 49. Energization of motor 41 causes rotation of gears 48 and 49 and the consequent movement of the scanner 45 parallel to the axis of drum 34. With each energization, the scanner 45 is moved one trace transversely across the record to read the side-by-side refraction traces.

Recording system 36 constitutes a drum 51 supported on a rotatable shaft 52 driven by suitable mechanism such as gear 53, worm shaft 38 and motor 39. The drum 51 is adapted with apparatus, not shown, for securing the recording medium in the form of magnetic tape 54 to the periphery of the drum 51. A single recording head 55, connected through switchable contact 56, to be described later, which cooperates with the tape 54 to produce a recorded magnetic record. The single recording head 55 is mounted on a threaded block 59 positioned by rotation of worm 60. The threaded block is guided by fixed rod 61 to prevent its rotation. Energization of motor 62 causes rotation of gear box 63 and the consequent movement of the recording head 55 parallel to the axis of drum 51.

The pitch of the worms 43 and 60 are so related that the scanners 44 and 45 are moved step-by-step from one side to the other of their respective drums while the cam 64 makes one complete revolution from one limiting position to another. Stepping switches likewise can aid in providing appropriate synchronization of the system, as previously mentioned.

Energization of the system illustrated in FIG. 8 is provided from a power source 65 to motor 39 and through switch contact 66 to the motors 41 and 62. Cam 64 on shaft 52 pushes on rod 67, against the bias of spring 68 to close the switch 66, the eccentric projection 69 of the cam 64 being the cause of contact 66 closing during the part of the revolution in which the magnetic tapes on drums 34 and 51 are in such a position that their respective heads 44 and 45 are in the peripheral gap between the beginning and the end of the tapes. During the relatively short time that these heads are in that gap and, therefore, not transmitting useful information, the heads are repositioned axially along their respective drums while the drums 34 and 51 continue to revolve at constant speed.

In operations refraction data on tape 40 of drum 34 flows via scanner 45 to a storage unit 70 and through an event selector 71 to counter 72, and hence to tape 54 on drum 51.

Analysis of the refraction data requires more than one trace to identify events of interest. Hence, both storage 70 and event selector 71 are interposed between scanner 45 and connector 56 as shown.

Event selector 71 compares a group of three adjacent refraction traces to detect arrival times within the central trace, as set forth in U.S. Pat. No. 3,149,302, Klein et al., for "Information Selection Programmer Emphasizing Relative Amplitude, Attribute Amplitude and Time Coherence," issued Sept. 15, 1964, assigned to the assignee of the instant application. The output of selector 71 is a single trace, modified in accordance with selection code described in the above-identified patent.

Storage unit 70 can include a multi-position relay connected to a recording means, as described in U.S. Pat. No. 3,149,303, Klein et al., "Seismic Cross Section Plotter," issued September 15, 1964 and assigned to the instant assignee.

Counter 72 is selectively operated on a predetermined "on-off" basis as follows: the activation spike of the source via scanner 45 activates the counter 72 while the occurrence of a refraction event on tape 40 of drum 33 terminates operations of the counter 72, after which a reset signal resets the counter 72 to zero and simultaneously activates the marker of head 55. Result: a refraction measure of time—a "mark"—is placed on the tape 54 wound about drum 51. As the process is repeated, a series of "timing marks" vs. offset position is provided, in the manner of FIG. 9. Operations cease through opening switch contacts 56 and 73 controlled by rod 74.

FIG. 9 illustrates a series of refraction travel time vs. common offset plots 75 annotated by sourcepoint activation number and/or position, provided by the apparatus of FIG. 8.

As shown, plots 75 are assembled in a paired, obliquely segmented basis to better aid in stratigraphic interpretation. In general, FIG. 9 shows individual plots of forward and reverse line vs. offset signature diagrams displayed side-by-side using adjacent profile oblique segments 76 and 77, each containing a series of normalizing "H" signature bars 78.

FIG. 9 is akin to the conventional common depth point stacking charts used in reflection seismology, and described in detail in Ser. No. 77,240 filed Sept. 19, 1979, now U.S. Pat. No. 4,316,268 issued Feb. 16, 1982 for "Method for Interpretation of Seismic Records to Yield Indications of Gaseous Hydrocarbons," W. J. Ostrander, and assigned to the assignee of the instant application.

In usual stacking diagrams as described in Ser. No. 756,584, several separate variables are addressable including amplitude vs. time values, offset positions (say, detector, sourcepoint, centerpoint positions), sourcepoint, profile line number, common offset lines, common centerpoint lines, and common detector location lines, etc.

In the above-identified application, emphasis was placed upon centerpoint location in a two-dimensional coordinate system, say in a X-Y domain along oblique lines, with the third dimension being reserved for analysis and processing of the amplitude-vs.-time traces.

In FIG. 9, in the instant invention, centerpoint position in the offset direction and common centerpoint locations have been assigned to the third dimension, remaining coordinates of interest addressable in the X-Y domain.

Of particular importance: travel time vs. offset coordinate of refraction events annotated as to direction of refraction arrivals and their sourcepoints.

For example, along the top of FIG. 9, the detector stations are numbered in sequence, while along the bottom of FIG. 9, the sourcepoint locations are likewise indicated. Each set of refraction-vs.-time values is plotted as shown with reference to the series of normalizing signature bars 78. Each bar 78 has a length equal to that of the detector spread plus twice the sourcepoint offset distance with respect to the spread ends, as discussed below.

In particular in FIG. 9, since plots 75 were generated using an end-shooting array in which sources and detectors advance 4 detector intervals per shot point, the "H" bars 78 overlap. Note further that each offset position (after initialization) is associated with 8 separate time values so that such values can be associated with common surface detector positions.

In order to geometrically associate generated data with common surface position, or common offset position, address guidance, as provided by printed "H" bars 78, is of some importance.

Signature bars 78 form the ordinates of the display and are seen to be paired into sets, each associated with an opposite arrival direction of the refraction wave. Each pair is spaced a constant distance, say, a value 2d feet where d is the rollalong increment of the field procedure.

Vertical upright segments 79 of each bar 78 coincides with the offset position of the sourcepoints, say $SP_1$, $SP_3$, $SP_5$... alignable along oblique line 80, and $SP_{12}$, $SP_{14}$... etc. alignable along oblique line 81.

Annotation of each H-bar 78 is preferably based on sourcepoint position, and direction of wave travel. "Forward" data profiles 76 designate that wave travel is in the same "forward" direction as array progression, while "reverse" data profiles 77 refer to wave travel in the opposite direction as array progression.

At the bottom of the display, the last-in-line profiles, say the profiles $S_z$ of profile segment 76 and profile column $S_{z+c}$ of segment 77, are related to the detector and shot point positions in a manner convenient for easy display. Note that if sourcepoint $S_z$ is odd, then sourcepoint $S_{z+c}$ is even, and vice versa.

FIGS. 10, 11, 12 and 13 illustrate how the plots of FIG. 9 can be used to indicate shape and model depth of a formation under survey.

In FIG. 10, note that the travel time data are associated with certain particular H-signature bars of FIG. 9, viz., bars 78a, 78b, 78c and 78d. I.e., the latter relate to and are associated with the forward profile column 76 of FIG. 9, say, annotated to sourcepoints $SP_9$, $SP_{11}$, $SP_{13}$ and $SP_{15}$, as shown.

Values of travel time vs. offset are plotted as shown.

Note the intersection points of the plotted points occur at breakpoints 82a, 82b, 82c and 82d. These breakpoints can be connected by a line 83 having a slope about equal to that line 80 through the sourcepoints $SP_9$, $SP_{11}$, $SP_{15}$... etc., of the signature bars 78a-78d. Result: the interpreter of the data can confidently assume that bedding to which the data relate is horizontal.

FIG. 11 illustrates travel times plotted for other certain H-signature bars occurring later in time in the survey, say, data associated with bars 78f, 78g, 78h, 78i and 78j, are also related to forward column profile 76 of FIG. 9. These are annotated to, say, sourcepoints $SP_{21}$, $SP_{23}$, $SP_{25}$, $SP_{27}$ and $SP_{29}$ as shown.

Note that here the breakpoints 85a, 85b, 85c, 85d and 85e do not align themselves parallel to line 80 through the sourcepoints $SP_{21}$, $SP_{23}$... etc. But instead these breakpoints aligned themselves along a line 87 whose slope is the vertical. Result: the interpreter can assume a vertical contact exists below the near bed undergoing survey. Hence, appropriate formulas for the geometry change can be implemented in the depth model as discussed below.

FIGS. 12 and 13 illustrate a further example of the method of the present invention in which the pairing of "H" signature bars 78 of FIG. 9 has been changed to provide more interpretive insight for the user.

As shown in FIG. 12, the adjacent pairing of H-bars has been changed so that oblique column segments 91 and 92 no longer are a combination of odd/even or even/odd sourcepoints as before. Instead, the pairings are changed to emphasize a particular bedding structure of FIG. 13 below a certain sourcepoint location, viz. sourcepoint 11 of FIG. 13.

In FIG. 12 note that the compressional travel time data are associated with certain particular H-signature bars, viz. bars 90a, 90b, 90c, ... 90k, and bars 90l, 90m ... 90v.

The former, in turn, relate to and are associated with the forward profile segment 91, say, annotated to sourcepoints $SP_1$, $SP_2$... $SP_{11}$, are shown. The latter in turn relate to and are associated with the rear profile segment 92 annotated to sourcepoints $SP_{11}$, $SP_{12}$... $SP_{21}$.

Breakpoints are as indicated, with vertical lines 97a-97f being drawn through them for emphasis.

Note that since the lines 97a-97f are somewhat vertical and deviate radially from common lines through sourcepoints $SP_1$, $SP_2$, $SP_3$... etc., and through $SP_{12}$, $SP_{13}$... etc., the bedding of interest is not horizontally disposed.

The compressional data of FIG. 12 further illustrate that apparent refraction times have been greatly affected by the shape of formation undergoing surveying, viz. by the presence of dike 93 of FIG. 13 uplifted through deeper beds 94 and 95 but terminating well below upper bed 96.

Of course, it is apparent that the above H-bar data can be easily used to indicate apparent compressional velocities as set forth in FIG. 12. True velocity of the bed 96 can then be calculated using intercept time-distance relationships well understood in the art, see Dobrin, op. cit., assuming correct pairs of forward and reverse plots, are utilized.

As to dike 93 of FIG. 13, the importance of using intercept times and apparent velocities associated with sourcepoint "H"-bars which do not straddle breaklines 97a-97b and 97d-97e must be emphasized. That is to say, intercept times and apparent velocities associated with "H"-bars 90k and 90v do not provide correct results which can be directly associated with dike 93, i.e., intercept times and apparent velocity deduced therefrom, from which the velocity and depth can be calculated as shown in FIG. 13, would be erroneous. Note that the slopes of the breakpoint lines are directly associated with the vertical slope of the walls of the dike 93 of FIG. 13, however.

On the other hand, if the data of H-bars 90j and 90m are used, the interpretive results would be correct.

Key to correctly interpreting H-bars 90a-90v: pick H-bar data closest to breakpoints in the forward and reverse direction but which do not straddle them, and so provide true indications of the intercept time and apparent velocity of the dike 93 of FIG. 13. Note also that the velocity magnitudes and intercept times associated with chosen forward and reverse pairs of H-bars also indicate the magnitude of the dips of the strata under survey. From such data, the interpreter can be provided with information from which true velocity data can be determined; while the intercept times and other distance-time data of FIG. 12 are used to calculate true compressional velocity, similar plots and values associated with shear waves are used, in a similar manner to calculate true shear velocity of each bed of interest with appropriate final displays of such data being available, as required.

FIGS. 14 and 15 illustrate a field example of final displays associated with various structures that have been surveyed using the method of the present invention.

FIG. 14 is a plot of various elastic parameters at a specific depth for a porphyry copper prospect, Stafford Mining District, Arizona.

Curve 100 is a plot of compressional velocity at a specific depth taken at various cross-sectional horizons; Curve 101 is a plot of shear velocity as a function of the same locations; Curve 102 is a diagram of Poisson's ratio at the same depth; and Curve 103 is a plot of a bulk modulus-bulk density ratio at the same depth for the above-identified prospect.

Note at fault 104 and dike 105 the dramatic change in values of interest.

FIG. 15 is a depth-versus-horizontal survey position plot of the above Stafford District, Arizona, copper prospect.

Note that the depth values were calculated using the methods of FIGS. 12 and 13 in conjunction with appropriate geometrial formulas set forth in Dobrin, op. cit. Note further that over a given but changeable depth interval, interface bedding segments can be identified. The segments to the left of fault 104 are seen to exist at 106–109, and each can be addressed and stored for future reference, say, as to length, end-point locations, compressional and shear velocity values, Poisson's ratio etc., as required. In that way, values storable in files within any analog or digital computer can be ordered out as required onto, say, a disk unit. Thereafter, any off-line digital plotter capable of generating the display of FIG. 15 is used in conjunction with the data on the disk unit. In this regard, equipment illustrated in "Continuous Automatic Migration," Ser. No. 567,458, filed Apr. 14, 1975, John W. Sherwood, assigned to the assignee of the instant application, is of interest, and can be used to address, index and store segments of data in accordance with the teachings of the present invention.

Such plotters are available in the art, and one proprietary model uses a computer-controlled CRT for optically merging onto photographic paper, as a display mechanism, the seismic data. Briefly, in such a plotter the data are converted to CRT deflection signals; the resulting beam is drawn on the face of the CRT and the optically merged record of the data is thereafter indicated, say, via photographic film. Then the film is processed in a photography laboratory and hard copies returned to the interpreters for their review. Additionally, the data could be plotted by hand, if desired. But for usual applications, in which speed is important, the plotter described above is preferred.

MODIFICATION

In some case, it may be desirable to use only single component detectors in the field spread so that only vertical displacement data is available. In such cases, modification of processing equipment to provide separate P-wave and S-wave plots prior to use of the apparatus of FIG. 8, is required. FIG. 16 provides such equipment.

With reference to FIG. 16, note that three separate magnetic tape recording and playback systems are illustrated at 120, 130 and 160. While the method of the present invention could be performed with less apparatus than shown herein by physically moving records back and forth between recording systems, the process is more easily described and understood by referring to the three systems as shown. It should be understood that other combinations of the apparatus, as well as other types of recording, reproducing and data processing systems are contemplated. An example of other such combinations would be a properly programmed digital computer.

Since the record contains both P-wave and S-wave energy, velocity "filtering" in accordance with this aspect of the present invention can occur based on arrival time of the events of interest.

The first magnetic recording system 120 constitutes a drum 121 supported on a rotatable drive shaft 122 driven by a suitable mechanism such as gear 123, worm shaft 141 and motor 142. Actual record processing in accordance with the present invention will require careful speed control for rotation of the systems 120, 130 and 160, as well as synchronization between the rotation of the record drums and the movements of heads within each system. The drum 121 is adapted with conventional apparatus, not shown, for securing a refraction record in the form of a magnetic tape 124 to the periphery of the drum, such trace being one provided by the refraction system of the present invention using single-component detectors for measuring vertical displacement only. A plurality of magnetic heads, not individually illustrated, are carried by a pivotally mounted head moving bar 125. The head moving bar 125 is here illustrated with a pivot at its center so as to be positioned in different transverse alignments with respect to the periphery of the drum and the longitudinal axis of the seismic record mounted thereon. The pivot is outside of the drum so that the drum may be rotated with respect to the bar and the heads. The individual heads are aligned with traces on the record and reproduce the electrical signals represented on the traces with differential time adjustments between traces caused by the alignment of head moving bar 125 with respect to the record. Since each trace is associated with a selected detector field coordinate, the dimensional characteristics of the traces are amplitude-vs.-time-and-horizontal coordinate.

The pivotally mounted head moving bar 125 is moved about its pivot by movement of a mechanical push rod 143 following a cam 144. The cam is rotated through gear box 145 from motor 146, and the cam and gear reduction are appropriately designed to provide for a total movement of head moving bar 125 between its pivotal limits in a predetermined number of steps. After each single revolution of the drum 121, motor 146 is energized by apparatus to be described, to cause one step of movement of the cam 144. During each stop of the bar 125 per single revolution of the drum 121, it is evident that the group of traces thus generated can be identified by a horizontal coordinate corresponding to the horizontal position of the pivot point of FIG. 16.

It should be understood that different schemes may be employed to provide individual control for the movement of each of the reproducing heads and also that cams of a different contour may be employed to produce stepped head movement in different increments. For example, in apparatus actually used to carry out the method of this invention, the magnetic pickup heads are not mounted on a simple bar, but instead are mounted on separate members that are capable of individual circumferential movements around the drum. The bar-type mechanism is illustrated here for didactic clarity.

The signals from summing amplifier 97 are passed to storage device 98 and thence to an event selector 99. Sophisticated analysis of traces to detect events requires more than one trace in simultaneous processing. Hence, storage device 98 is positioned between the amplifier 97 and selector 99 as depicted in FIG. 16.

In U.S. Pat. No. 3,149,302, Kelin et al, for "Informational Selection Programmer Employing Relative Amplitude, Absolute Amplitude and Time Coherence," issued Sept. 15, 1964, and assigned to the assignee of the present application, a method and apparatus for forming the comparative analysis of seismic traces was disclosed. In that patent, a group of three adjacent traces are compared for selectional purpose to detect events within the central one of the three traces. Since event selector 99 functions in accordance with predetermined selection codes (or sets of rules) to identify certain amplitude excursions along each of the sum traces from the storage device 98 that are believed to represent coherent energy on the original record that, in turn, represent probable refractions, the output from the selector 99 is a single trace whose amplitude or intensity is modified according to the picking selection code of the type described in U.S. Pat. No. 3,149,302. That patent further discloses that the use of three traces is arbitrary and the number of traces selected for the comparison will be determined by the sensitivity pattern of the array and by the time delay (moveout) employed in extracting the directional information from the original field traces. However, it should be noted that it is not necessary to produce and store all of the directional traces before the selection process occurs, since only a limited few are actually used at any one time in the selection of events. U.S. Pat. No. 3,149,303, Klein et al, for "Seismic Cross Section Plotter," issued Sept. 15, 1964, discloses a temporary storage device useful in accomplishing the temporary storage of directional seismic traces. As described in that patent, a typical storage device includes a multiposition relay connected to a multichannel recording means. As each sonogram trace is produced from the original traces, that trace is applied through the multiposition relay to the recording means. Each channel of the recording medium will have the necessary elements to record, reproduce and erase the signals within itself. Referring again to FIG. 16, if such a multiposition relay is used, it can be stepped through each of its positions using, say, linkage 143 connected as illustrated in FIG. 16 so that in each of its successive positions the directional seismic trace produced from a summing bar 125 will be applied to a different one of the separate channels of the recording means.

Attention should also be directed to the fact that other event selectors could be utilized in the present invention, as for example that event selector described in U.S. Pat. No. 3,273,114, Stephenson et al, for "Ergodic Signal Picking," issued Sept. 13, 1966 and assigned to the assignee of the present application. In that patent, there is described a method and apparatus for performing the selection of seismic events based on a statistical deviation of instantaneous measured characteristics from measured normalized average characteristics with respect to the original record. However, if such a picking method were used, the apparatus of FIG. 16 would be somewhat modified. Likewise, combinations of the aforementioned devices and methods may also be useful in carrying out the present invention. In this regard, since the tailoring of steps to achieve specified selection goals may now be of importance in the processing of seismic data, a method having particular utility in the operating modes of the present invention will now be described. It will become evident from the discussion which follows that the method is, in essence, time-averaging event detection and incorporates features of the event selectors and methods referenced above. Briefly, in this method, for each sonogram trace to be picked, a corresponding "control trace" is generated, whose amplitude values as a function of time may be only zero of unity. Multiplication of each sonogram trace by its corresponding control trace emphasizes those portions of the sonogram trace considered to contain seismically meaningful events.

Now in more detail, the generation of the control trace involves several steps, which may be thought of as being in two separate, parallel groups of steps: (i) the first group of steps consists of individually squaring and integrating each of the traces of the original seismic record to produce a set of individual traces which represent the power in the original individual traces. Then, the power traces are sonogrammed to produce a set of "sonogram average power traces", one for each moveout used in the sonogramming process; and (ii) the second group of steps consists of individually squaring and integrating each of the traces of the original seismic record to produce a set of individual traces which represent the power in the original individual traces. Then the power traces are sonogrammed to produce a set of "sonogram average power traces," one for each moveout used in the sonogramming process; and (ii) the second group of steps consists of, first, individually squaring and integrating the regular sonogram traces to obtain individual "power traces of a sonogram". Then, the amplitude values on these traces are divided, point by point, by the amplitude values on the previously derived, corresponding, sonogram average power traces. The result at this point is a set of "normalized power traces", one trace for each trace of the starting sonogram. The normalized traces are then scanned to find portions whose values are above a threshold number, e.g., 0.20, and for each of the normalized traces a control trace is then generated whose amplitude value is zero when that of the normalized power trace is greater than the threshold value and whose amplitude value is unity when that of the normalized power traces is greater than the threshold value. Finally, each of the starting sonogram traces is multiplied, point by point, by its corresponding control trace, to give a corresponding picked sonogram trace, whose amplitude values are those of the starting sonogram trace in the time intervals when the control trace was unity, and whose amplitude values are zeroed out when the control trace was zero.

The preceding steps to obtain picked sonogram traces by control trace multiplication may be varied in many possible ways. Variations include scanning the normalized power traces three at a time, fitting parabolas to the coincident peaks, and comparing the peak values of the fitted parabolas to the threshold value.

From event selector 99, the picked signals are passed through switchable contacts 183, to be described hereinafter, to recording system 130. System 130 constitutes a rotatable drum 131 mounted on shaft 132 driven by gear 133 through engagement with worm 141 rotated by motor 142. The recording system 130 is provided with a single recording head 134 to record the signals supplied from event selector 99. Recording head 134 is positioned parallel to the axis of the drum in accordance with rotation of worm 135 driven from drive motor 146 by mechanism similar to that employed for pickup head 125 in system 120 so that head 134 is moved step by step transversely across the surface of drum 131. In each of its positions, recording head 134 records onto the magnetic tape 136 of the recording system 130 a picked sonogram trace derived from the record 124 of recording system 120.

The recording system 130 further includes a plurality of pickup heads, not individually illustrated, carried on a pivotally mounted head moving bar 137 illustrated with a pivot at its center 138. Head moving bar 137 is mounted and movable similarly to bar 125 of system 120. The individual pickup heads reproduce the electrical signals represented on the traces of the record recorded on tape 136 and these signals are transmitted as individual signals through conductors 139 to a trace selector 151 and then to a summing amplifier 152. Switchable contacts 184, to be described, are provided between the recording system 130 and the trace selector 151.

The pivotally mounted head moving bar 137 is moved about its pivot 138 by movement of a mechanical push rod 153 following a cam 154. The cam is rotated through a gear box 155 from motor 156 and is appropriately designed to provide for a total movement of the head moving bar 137 between its pivotal limits in a predetermined number of steps. After each single revolution of the drum 131, motor 156 is energized to cause one step of movement of the cam 154.

When head moving bar 125 is aligned as illustrated in FIG. 16, attention should be directed to the fact that the sensitivity of the collectively moving heads will be most representative to signals having a moveout along the time axis of the record proportional to angle alpha where alpha is the angle between bar 125 and a horizontal line in the plane of tape 124. If the length of the bar 125 intersecting imaginary verticals emanating from the surface of tape 124 passing through the left-most and the most-right traces of the record 136 (or for that matter any N traces), then the time moveout along the record, $<T$, is equal to (Sin)L where L is the bar length. The resulting summed signals from bar 125 aligned in the position depicted in FIG. 16, thus can be said to represent the largest and most negative directional trace of the process, and for reasons set forth in the specification, supra, will be designated the $(-60)$ millisecond trace. The $(-60)$ millisecond trace will be recorded as the left-most trace on record 136, ad depicted in FIG. 16. Similarly, when the moving bar 125 is positioned as illustrated in FIG. 16, the heads will be most responsive to directional signals having a record moveout which is the largest and most positive value of the process. As the summed signals are recorded on record 136, such summed signals will be recorded at the right-most trace, and for reasons of clarification to be discussed below, it is designated $(+60)$ millisecond trace. Between the aforementioned left- and right-most sonogram traces on record 136 there will be recorded additional traces representing proportional moveout magnitudes between the left-most and right-most traces with the zero moveout trace usually being centered therebetween. The number of additional traces can range between any convenient number, say, 10 to 30 traces, with about 20 being preferred.

By convention in the sonogram process, the summation trace signals are recorded on record 136 at a longitudinal position along the trace corresponding to the time position of the center or pivot point of summation angle or, in the case illustrated, the center of bar 125. An event, appearing first in time on the trace on the left of record 124 and later on the trace to the right, would appear on a trace on record 136 to the left of center with the event being recorded at a longitudinal position along the record determined by the position of the pivot point of the head moving bar 125 with respect to the longitudinal or time axis of record 124.

The trace selector 151 is for the purposes of including, or excluding, any individual sonogram trace from the sonogram record 136 so as to exclude or include only P-wave or only S-wave events in the final record. That is, P-wave and S-wave events can be easily separated with one or the other through selection codes provided in trace selector 151. In this regard, attendant circuitry within selector 151 is activated to cause inclusion of representations of the sonogram trace, those representations having either a positive or negative sign (with regard to the latter distinction, amplitudes having negative signs bring about amplitude inversion of the trace). Exclusion of representations can also occur in which individual sonogram traces are prevented from passage through the selector 151, and, accordingly, are prevented from further processing in accordance with the procedures of the present invention.

Trace selector 151 may be thought of as a set of transformers, one for each trace to be fed into the selector 151. Since it is usual to process traces in a selected group, selector 151 could consist of several separate transformers in parallel. With the secondary of each transformer center-tapped to ground, connection to one end of a secondary would give a voltage proportional to the input signal, and of the same sign, while connection to the other end of the secondary would give a similar voltage, but of the opposite sign. Non-connection to either end (switch means inactivated), of course, would simply exclude the trace in question. In actual practice, these conceptual transformers are replaced by pairs of operational amplifiers capable of giving, for each input channel, a pair of proportional outputs, one positive and the other negative, and also capable, of course, of giving zero output, when switched off.

Attention should now be directed to the fact that the decision whether or not to include or exclude a particular sonogram trace or group of traces at the selector 151 is not based on criteria developed after the processing of the data has begun. The criteria are developed and implemented by a seismologist prior to the initial sonogramming step. Once a particular decision has been made by the seismologist, the apparatus of FIG. 16 carries out his commmands using conventional circuitry such as a series of switches whose actuation is scheduled prior to the initial processing steps. For example, mechanical linkage 140 could be a series of cams attached to a common shaft through gear box 155, the cams coming into effect as a function of the angle of rotation of that shaft. It should be pointed out, however, that linkage 140 is depicted as a mechanical unit for didactic simplicity only. It indicates that the same mechanism which determines the settings of head moving bar 137 should also determine the switch settings of the switch means within selector 151. In practice, both the head moving bar 137 and the switch means of trace selector 151 can be actuated by stepping switches which step as a function of drum rotation, to provide the required informational selection.

The traces passed through selector 151 are supplied to summing amplifier 152 where they are combined to produce a single output trace for each revolution of the drum 131. The summed signal output from summing amplifier 152 constitutes individual seismic trace-like signals and is passed to recording system 160.

Recording system 160 constitutes a drum 161 supported on a rotatable shaft 162 driven by suitable mechanism such as gear 163, worm shaft 141 and motor 142. The drum 161 is adapted with apparatus, not shown, for securing a recording medium in the form of a magnetic tape 164 to the periphery of the drum. A single recording head 165, connected to and through switchable contacts 185, to be described later, cooperates with the tape 164 to produce a recorded magnetic record. The single recording head 165 is mounted on a threaded block 166 positioned by rotation of worm 167. The threaded block is guided by fixed rod 168 to prevent its rotation. Energization of motor 156 causes rotation of gear 159 and the consequent movement of the recording head 165 parallel to the axis of the drum 161.

The pitch of the worms 135 and 167 and the contour of the cams 144 and 154 are related so that the heads 125, 137 and 165 are moved step by step from one side to the other of their respective drums while the cams make one complete revolution to move the head moving bars 125 and 137 from one limiting position to another. Stepping switches likewise can aid in providing appropriate synchronization of the system, as previously mentioned.

Energization of the system illustrated in FIG. 16 is provided from a power source 171 (through switch contacts 172 to motors 146 and 156) and directly to motor 142. Cam 173 on shaft 162 pushes on rod 174, against the bias of spring 175, to close the contacts 172. The eccentric projection 176 of the cam 173 causes contacts 172 to be closed only during the part of the revolution in which the magnetic tapes on drums 121, 131 and 161 are in such a position that their respective heads 134 and 165 are in the peripheral gap between the beginning and the end of the tapes. During the relatively short time that these heads are in that gap and, therefore, not transmitting useful information, the heads are repositioned axially along their respective drums while the drums 121, 131 and 161 continue to revolve at constant speed.

Individual switching contacts are shown at 182, 183, 184 and 185, between bar 125 and summing amplifier 97, between event selector 99 and recording head 134, and between cable 139 and trace selector 151, and between summing amplifier 152 and head 165. The switchable contacts 182, 183, 184 and 185 are collectively operated by a linkage 186 and a master control rod 187. It should be apparent that when contacts 182 and 183 are open, contacts 184 and 185 are closed, and that when contacts 182 and 183 are open, the contacts 184 and 185 are closed. In the "down" position, the first sonogramming process will be performed and in the "up" position the second sonogramming will be performed.

The operation of the mechanism in performing the method of the present invention should be readily apparent from the foregoing description of the apparatus schematically illustrated in FIG. 16. With a corrected seismic record positioned on the periphery of drum 121 of record system 110 and a blank recording tape placed on the periphery of drum 131 of the recording system 130 and with master control rod 187 in the illustrated position, the pivotally mounted head moving bar 125 as shown, and the recording head 134 as shown, the record of recording system 120 may be sonogrammed with each drum revolution to produce individual traces of an event-selected sonogram record on the recording tape 136. After each individual trace is completed, head moving bar 125 with pickup heads will be shifted for the production of the next trace until the full sonogram record has been completed.

After the complete conongram record has been produced, the master control rod 187 will be moved from the position shown to a new position, and the recording systems energized a second time. The first trace of the simulated trace record produced in recording system 130 is recorded as the first trace on a blank magnetic tape on the periphery of the drum 161 of recording system 160. When all of these traces have been produced, in sequence, the record now recorded on the tape 164 of the recording system 160 will be the new improved record in which P-wave and S-wave energy have been separated. And the improved P-wave or S-wave record on tape 164 is available for further processing in accordance with the apparatus of FIG. 8.

The following Patents assigned to the assignee of the present invention which contain sorting and stacking techniques, including beam steering techniques, are of interest in carrying out the method of the present invention.

| Patent | Issued | Inventor | Title |
| --- | --- | --- | --- |
| 3,597,727 | 12/30/68 | Judson et al | Method of Attenuating Multiple Seismic Signals in the Determination of Inline and Cross Dips Employing Cross-Steered Seismic Data |
| 3,806,863 | 4/23/74 | Tilley et al | Method of Collecting Seismic Data of Strata Underlying Bodies of Water |
| 3,638,178 | 1/25/72 | Stephenson | Method of Processing Three-Dimensional Seismic Data to Select and Plot Said Data on a Two-Dimensional Display Surface |
| 3,346,840 | 10/10/67 | Lara | Double Sonogramming for Seismic Record Improvement |
| 3,766,519 | 10/16/73 | Stephenson | Method for Processing Surface Detected Seismic Data to Plotted Representations of Subsurface Directional Seismic Data |
| 3,784,967 | 1/8/74 | Graul | Seismic Record Processing Method |
| 3,149,302 | 9/15/74 | Klein et al | Information Selection Programmer Employing Relative Amplitude, Absolute Amplitude and Time Coherence |
| 3,149,303 | 9/15/64 | Klein et al | Seismic Cross-Section Plotter |

FIG. 17 is a flow diagram illustrative of a computer-dominated process in which the functions required by the method of the present invention can be easily ascertained.

The steps of FIG. 17 include generating addresses for the P-wave and S-wave refraction data. Variables to be addressed include: refraction amplitude-vs.-time values; offset position (detector, sourcepoint, centerpoint) sourcepoint-profile number, common offset lines, common centerpoint lines, and common detector location lines, as previously noted. After P-wave and S-wave refraction events have selected and classified, the resulting data are plotted, say, as a function of offset position in the manner of FIG. 9.

After the apparent refraction time-vs.-offset data have been displayed and shape of the formation determined as previously suggested, P-wave and S-wave velocity determinations can occur.

FIG. 18 illustrates particular elements of a computing system for carrying out the steps of FIG. 17. While many computing systems are available to carry out the process of the invention, perhaps to best illustrate operations at the lowest cost per instruction, a microcomputing system 250 is didactically best and is presented in detail below. The system 250 of FIG. 18 can be implemented on hardware provided by many different manufacturers, and for this purpose, elements provided by Intel Corporation, Santa Clara, Calif., may be preferred.

Such a system 250 can include a CPU 251 controlled by a control unit 252. Two memory units 253 and 254 connect to the CPU 251 through BUS 255. Program memory unit 253 stores instructions for directing the activities of the CPU 251 while data memory unit 254 contains data (as data words) related to the seismic data provided by the field acquisition system. Since the seismic traces contain large amounts of bit data, an auxiliary memory unit 255 can be provided. The CPU 251 can rapidly access data stored through addressing the particular input port, say, at 256 in the Figure. Additional input ports can also be provided to receive additional information as required from usual external equipment well known in the art, e.g., floppy disks, paper-tape readers, etc., including such equipment interfaced through input interface port 257 tied to a keyboard unit 258 for such devices. Using clock inputs, control circuitry 252 maintains the proper sequence of events required for any processing task. After an instruction is fetched and decoded, the control circuitry issues the appropriate signals (to units both internal and external) for initiating the proper processing action. Often the control circuitry will be capable of responding to external signals, such as an interrupt or wait request. An interrupt request will cause the control circuitry 252 to temporarily interrupt main program execution, jump to a special routine to service the interrupting device, then automatically return to the main program. A wait request is often issued by memory units 253 or 254 or an I/O element that operates slower than the CPU.

For outputting information, the system 250 can include a printer unit 259 whereby the amplitude of the summed traces as a function of time is printable. Of more use as an output unit, however, is disk unit 260, which can temporarily store the data. Thereafter, an off-line digital plotter capable of generating a side-by-side display is used in conjunction with the data on the disk unit 260. Such plotters are available in the art, and one proprietary model has been previously described as a computer-controlled CRT for optically merging onto photographic paper, as a display mechanism, the seismic data.

FIG. 19 illustrates CPU 251 and control unit 252 in more detail.

As shown, the CPU 251 includes an array of registers generally indicated at 262 tied to an ALU 263 through an internal data bus 264 under control of control unit 252. The registers 262 are temporary storage areas. Program counter 265 and instruction register 266 have dedicated uses; the other registers, such as accumulator 267, have more general uses.

The accumulator 267 usually stores one of the seismic operands to be manipulated by the ALU 263. For example, in the summation of traces, the instruction may direct the ALU 263 to not only add in sequence the contents of the temporary registers containing predetermined trace amplitudes together with an amplitude value in the accumulator, but also store the result in the accumulator itself. Hence, the accumulator 267 operates as both a source (operand) and a destination (result) register. The additional registers of the array 262 are useful in manipulation of seismic data, since they eliminate the need to shuffle results back and forth between the external memory units of FIG. 18 and accumulator 267. In practice, most ALU's also provide other built-in functions, including hardware subtraction, boolean logic operations, and shift capabilities. The ALU 263 also can utilize flag bits generated by FF unit 273 which specify certain conditions that arise in the course of arithmetical and logical manipulations. Flags typically include carry, zero, sign, and parity. It is possible to program jumps which are conditionally dependent on the status of one or more flags. Thus, for example, the program may be designed to jump to a special routine if the carry bit is set following an addition instruction.

Instruction making up the program for operations involving seismic data are stored in the program memory unit 253 of the CPU 251 of FIG. 18. The program is operated upon in a sequential manner except when instructions in the memory units 253, 254 call for special commands such as "jump" (or "call") instructions. While the program associated with the present invention is a relatively straightforward one, hence avoiding most "jump" and "call" instructions, "call" instructions for subroutines are common in the processing of seismic data and could be utilized, if desired. In "call" instructions, the CPU 251 has a special way of handling subroutines in order to insure an orderly return to the main program. When the processor receives a call instruction, it increments the program counter 265 and notes the counter's contents in a reserved memory area of the memory unit known as the "stack".

CPU's have different way of maintaining stack contents. Some have facilities for the storage of return addresses built into the CPU itself. Other CPU's use a reserved area of external memory as the stack and simply maintain a "pointer" register, such as pointer register 270, FIG. 19, which contains the address of the most recent stack entry. The stack thus saves the address of the instruction to be executed after the subroutine is completed. Then the CPU 251 loads the address in the call into its program counter 265. The next instruction fetched will therefore be the first step of the subroutine. The last instruction in any subroutine is a "return". Such an instruction need specify no address.

Having now breifly described the operations of the CPU 251, Table I is presented below containing a full instruction set for its operations.

TABLE I

| | | Summary of Processor Instructions by Alphabetical Order | | | | | | | | | |
|---|---|---|---|---|---|---|---|---|---|---|---|
| | | | Instruction Code[1] | | | | | | | | Clock[2] |
| Mnemonic | Description | | $D_7$ | $D_6$ | $D_5$ | $D_4$ | $D_3$ | $D_2$ | $D_1$ | $D_0$ | Cycles |
| ACI | Add immediate to A with carry | | 1 | 1 | 0 | 0 | 1 | 1 | 1 | 0 | 7 |
| ADC M | Add memory to A with | | | | | | | | | | |

TABLE I-continued
Summary of Processor Instructions by Alphabetical Order

| Mnemonic | Description | $D_7$ | $D_6$ | $D_5$ | $D_4$ | $D_3$ | $D_2$ | $D_1$ | $D_0$ | Clock[2] Cycles |
|---|---|---|---|---|---|---|---|---|---|---|
| | carry | 1 | 0 | 0 | 0 | 1 | 1 | 1 | 0 | 7 |
| ADC r | Add register to A with carry | 1 | 0 | 0 | 0 | 1 | S | S | S | 4 |
| ADD M | Add memory to A | 1 | 0 | 0 | 0 | 0 | 1 | 0 | 1 | 7 |
| ADD r | Add register to A | 1 | 0 | 0 | 0 | 0 | S | S | S | 4 |
| ADI | Add immediate to A | 1 | 1 | 0 | 0 | 0 | 1 | 1 | 0 | 7 |
| ANA M | And memory with A | 1 | 0 | 1 | 0 | 0 | 1 | 1 | 0 | 7 |
| ANA r | And register with A | 1 | 0 | 1 | 0 | 0 | S | S | S | 4 |
| ANI | And immediate with A | 1 | 1 | 1 | 0 | 0 | 1 | 1 | 0 | 7 |
| CALL | Call unconditional | 1 | 1 | 0 | 0 | 1 | 1 | 0 | 1 | 17 |
| CC | Call on carry | 1 | 1 | 0 | 1 | 1 | 1 | 0 | 0 | 11/17 |
| CM | Call on minus | 1 | 1 | 1 | 1 | 1 | 1 | 0 | 0 | 11/17 |
| CMA | Compliment A | 0 | 0 | 1 | 0 | 1 | 1 | 1 | 1 | 4 |
| CMC | Compliment carry | 0 | 0 | 1 | 1 | 1 | 1 | 1 | 1 | 4 |
| CMP M | Compare memory with A | 1 | 0 | 1 | 1 | 1 | 1 | 1 | 0 | 7 |
| CMP r | Compare register with A | 1 | 0 | 1 | 1 | 1 | S | S | S | 4 |
| CNC | Call on no carry | 1 | 1 | 0 | 1 | 0 | 1 | 0 | 0 | 11/17 |
| CNZ | Call on no zero | 1 | 1 | 0 | 0 | 0 | 1 | 0 | 0 | 11/17 |
| CP | Call on positive | 1 | 1 | 1 | 1 | 0 | 1 | 0 | 0 | 11/17 |
| CPE | Call on parity even | 1 | 1 | 1 | 0 | 1 | 1 | 0 | 0 | 11/17 |
| CPI | Compare immediate with A | 1 | 1 | 1 | 1 | 1 | 1 | 1 | 0 | 7 |
| CPO | Call on parity odd | 1 | 1 | 1 | 0 | 0 | 1 | 0 | 0 | 11/17 |
| CZ | Call on zero | 1 | 1 | 0 | 0 | 1 | 1 | 0 | 0 | 11/17 |
| DAA | Decimal adjust A | 0 | 0 | 1 | 0 | 0 | 1 | 1 | 1 | 4 |
| DAD B | Add B&C to H&L | 0 | 0 | 0 | 0 | 1 | 0 | 0 | 1 | 10 |
| DAD D | Add D&E to H&L | 0 | 0 | 0 | 1 | 1 | 0 | 0 | 1 | 10 |
| DAD H | Add H&L to H&L | 0 | 0 | 1 | 0 | 1 | 0 | 0 | 1 | 10 |
| DAD SP | Add stack pointer to H&L | 0 | 0 | 1 | 1 | 1 | 0 | 0 | 1 | 10 |
| DCR M | Decrement memory | 0 | 0 | 1 | 1 | 0 | 1 | 0 | 1 | 10 |
| DCR r | Decrement register | 0 | 0 | D | D | D | 1 | 0 | 1 | 5 |
| DCX B | Decrement B&C | 0 | 0 | 0 | 0 | 1 | 0 | 1 | 1 | 5 |
| DCX D | Decrement D&E | 0 | 0 | 0 | 1 | 1 | 0 | 1 | 1 | 5 |
| DCX H | Decrement H&L | 0 | 0 | 1 | 0 | 1 | 0 | 1 | 1 | 5 |
| DCX SP | Decrement stack pointer | 0 | 0 | 1 | 1 | 1 | 0 | 1 | 1 | 5 |
| DI | Disable interrupt | 1 | 1 | 1 | 1 | 0 | 0 | 1 | 1 | 4 |
| EI | Enable interrupts | 1 | 1 | 1 | 1 | 1 | 0 | 1 | 1 | 4 |
| HLT | Halt | 0 | 1 | 1 | 1 | 0 | 1 | 1 | 0 | 7 |
| IN | Input | 1 | 1 | 0 | 1 | 1 | 0 | 1 | 1 | 10 |
| INR M | Increment memory | 0 | 0 | 1 | 1 | 0 | 1 | 0 | 0 | 10 |
| INR r | Increment register | 0 | 0 | D | D | D | 1 | 0 | 0 | 5 |
| INX B | Increment B&C registers | 0 | 0 | 0 | 0 | 0 | 0 | 1 | 1 | 5 |
| INX D | Increment D&E registers | 0 | 0 | 0 | 1 | 0 | 0 | 1 | 1 | 5 |
| JC | Jump on carry | 1 | 1 | 0 | 1 | 1 | 0 | 1 | 0 | 10 |
| JM | Jump on minus | 1 | 1 | 1 | 1 | 1 | 0 | 1 | 0 | 10 |
| JMP | Jump unconditional | 1 | 1 | 0 | 0 | 0 | 0 | 1 | 1 | 10 |
| JNC | Jump on no carry | 1 | 1 | 0 | 1 | 0 | 0 | 1 | 0 | 10 |
| JNZ | Jump on no zero | 1 | 1 | 0 | 0 | 0 | 0 | 1 | 0 | 10 |
| JP | Jump on positive | 1 | 1 | 1 | 1 | 0 | 0 | 1 | 0 | 10 |
| JPE | Jump on parity even | 1 | 1 | 1 | 0 | 1 | 0 | 1 | 0 | 10 |
| JPO | Jump on parity odd | 1 | 1 | 1 | 0 | 0 | 0 | 1 | 0 | 10 |
| JZ | Jump on zero | 1 | 1 | 0 | 0 | 1 | 0 | 1 | 0 | 10 |
| LDA | Load A direct | 0 | 0 | 1 | 1 | 1 | 0 | 1 | 0 | 13 |
| LDAX B | Load A indirect | 0 | 0 | 0 | 0 | 1 | 0 | 1 | 0 | 7 |
| LDAX D | Load A indirect | 0 | 0 | 0 | 1 | 1 | 0 | 1 | 0 | 7 |
| LHLD | Load H&L direct | 0 | 0 | 1 | 0 | 1 | 0 | 1 | 0 | 16 |
| LXI B | Load immediate register pair B&C | 0 | 0 | 0 | 0 | 0 | 0 | 0 | 1 | 10 |
| LXI D | Load immediate register pair D&E | 0 | 0 | 0 | 1 | 0 | 0 | 0 | 1 | 10 |
| LXI H | Load immediate register Pair H&L | 0 | 0 | 1 | 0 | 0 | 0 | 0 | 1 | 10 |
| LXI SP | Load immediate stack pointer | 0 | 0 | 1 | 1 | 0 | 0 | 0 | 1 | 10 |
| MVI M | Move immediate memory | 0 | 0 | 1 | 1 | 0 | 1 | 1 | 0 | 10 |
| MVI r | Move immediate register | 0 | 0 | D | D | D | 1 | 1 | 0 | 7 |
| MOV m,r | Move register to memory | 0 | 1 | 1 | 1 | 0 | S | S | S | 7 |
| MOV r,M | Move memory to register | 0 | 1 | D | D | D | 1 | 1 | 0 | 7 |
| MOV $r_1,r_2$ | Move register to register | 0 | 1 | D | D | D | S | S | S | 5 |

TABLE I-continued

Summary of Processor Instructions by Alphabetical Order

| Mnemonic | Description | $D_7$ | $D_6$ | $D_5$ | $D_4$ | $D_3$ | $D_2$ | $D_1$ | $D_0$ | Clock[2] Cycles |
|---|---|---|---|---|---|---|---|---|---|---|
| NOP | No operation | 0 | 0 | 0 | 0 | 0 | 0 | 0 | 0 | 4 |
| ORA M | Or memory with A | 1 | 0 | 1 | 1 | 0 | 1 | 1 | 0 | 7 |
| ORA r | Or register with A | 1 | 0 | 1 | 1 | 0 | S | S | S | 4 |
| ORI | Or immediate with A | 1 | 1 | 1 | 1 | 0 | 1 | 1 | 0 | 7 |
| OUT | Output | 1 | 1 | 0 | 1 | 0 | 0 | 1 | 1 | 10 |
| PCHL | H&L to program counter | 1 | 1 | 1 | 0 | 1 | 0 | 0 | 1 | 5 |
| POP B | Pop register pair B&C off stack | 1 | 1 | 0 | 0 | 0 | 0 | 0 | 1 | 10 |
| POP D | Pop register pair D&E off stack | 1 | 1 | 0 | 1 | 0 | 0 | 0 | 1 | 10 |
| POP H | Pop register pair H&L off stack | 1 | 1 | 1 | 0 | 0 | 0 | 0 | 1 | 10 |
| POP PSW | Pop A and Flags off stack | 1 | 1 | 1 | 1 | 0 | 0 | 0 | 1 | 10 |
| PUSH B | Push register Pair B&C on stack | 1 | 1 | 0 | 0 | 0 | 1 | 0 | 1 | 11 |
| PUSH D | Push register Pair D&E on stack | 1 | 1 | 0 | 1 | 0 | 1 | 0 | 1 | 11 |
| PUSH H | Push register Pair H&L on stack | 1 | 1 | 1 | 0 | 0 | 1 | 0 | 1 | 11 |
| PUSH PSW | Push A and Flags on stack | 1 | 1 | 1 | 1 | 0 | 1 | 0 | 1 | 11 |
| RAL | Rotate A left through carry | 0 | 0 | 0 | 1 | 0 | 1 | 1 | 1 | 4 |
| RAR | Rotate A right through carry | 0 | 0 | 0 | 1 | 1 | 1 | 1 | 1 | 4 |
| RC | Return on carry | 1 | 1 | 0 | 1 | 1 | 0 | 0 | 0 | 5/11 |
| RET | Return | 1 | 1 | 0 | 0 | 1 | 0 | 0 | 1 | 10 |
| RLC | Rotate A Left | 0 | 0 | 0 | 0 | 0 | 1 | 1 | 1 | 4 |
| RM | Return on minus | 1 | 1 | 1 | 1 | 1 | 0 | 0 | 0 | 5/11 |
| RNC | Return on no carry | 1 | 1 | 0 | 1 | 0 | 0 | 0 | 0 | 5/11 |
| RNZ | Return on no zero | 1 | 1 | 0 | 0 | 0 | 0 | 0 | 0 | 5/11 |
| RP | Return on positive | 1 | 1 | 1 | 1 | 0 | 0 | 0 | 0 | 5/11 |
| RPE | Return on parity even | 1 | 1 | 1 | 0 | 1 | 0 | 0 | 0 | 5/11 |
| RPO | Return on parity odd | 1 | 1 | 1 | 0 | 0 | 0 | 0 | 0 | 5/11 |
| RRC | Rotate A right | 0 | 0 | 0 | 0 | 1 | 1 | 1 | 1 | 4 |
| RST | Restart | 1 | 1 | A | A | A | 1 | 1 | 1 | 11 |
| RZ | Return on zero | 1 | 1 | 0 | 0 | 1 | 0 | 0 | 0 | 5/11 |
| SBB M | Subtract memory from A with borrow | 1 | 0 | 0 | 1 | 1 | 1 | 1 | 0 | 7 |
| SBB r | Subtract register from A with borrow | 1 | 0 | 0 | 1 | 1 | S | S | S | 4 |
| SBI | Subtract immediate from A with borrow | 1 | 1 | 0 | 1 | 1 | 1 | 1 | 0 | 7 |
| SHLD | Store H&L direct | 0 | 0 | 1 | 0 | 0 | 0 | 1 | 0 | 16 |
| SPHL | H&L to stack pointer | 1 | 1 | 1 | 1 | 1 | 0 | 0 | 1 | 5 |
| STA | Store A direct | 0 | 0 | 1 | 1 | 0 | 0 | 1 | 0 | 13 |
| STAX B | Store A indirect | 0 | 0 | 0 | 0 | 0 | 0 | 1 | 0 | 7 |
| STAX D | Store A indirect | 0 | 0 | 0 | 1 | 0 | 0 | 1 | 0 | 7 |
| STC | Set carry | 0 | 0 | 1 | 1 | 0 | 1 | 1 | 1 | 4 |
| SUB M | Subtract memory from A | 1 | 0 | 0 | 1 | 0 | 1 | 1 | 0 | 7 |
| SUB r | Subtract register from A | 1 | 0 | 0 | 1 | 0 | S | S | S | 4 |
| SUI | Subtract immediate from A | 1 | 1 | 0 | 1 | 0 | 1 | 1 | 0 | 7 |
| XCHG | Exchange D&E, H&L Registers | 1 | 1 | 1 | 0 | 1 | 0 | 1 | 1 | 4 |
| XRA M | Exclusive Or memory with A | 1 | 0 | 1 | 0 | 1 | 1 | 1 | 0 | 7 |
| XRA r | Exclusive Or register with A | 1 | 0 | 1 | 0 | 1 | S | S | S | 4 |
| XRI | Exclusive Or immediate with A | 1 | 1 | 1 | 0 | 1 | 1 | 1 | 0 | 7 |
| XTHL | Exchange top of stack, H&L | 1 | 1 | 1 | 0 | 0 | 0 | 1 | 1 | 18 |

[1] DDD or SSS-000B-001C-010D-011E-100H-101L-110 Memory-111A.
[2] Two possible cycle times (5/11) indicate instruction cycles dependent on condition flags.

The method of the present invention provides a geophysicist with tools for determining shape of formations as well as elastic parameters of interest to indicate likelihood of the formation of interest containing ore, marker rock, economic minerals, and the like. However, the invention is not limited to the above-described combinations alone. For example, under certain circumstances, it may be desirable to improve resolution of compressional and shear wave events in the records provided by the array of FIG. 5.

MODIFICATION

Initially, it should be mentioned that the array 20 of FIG. 5 provides records in which discernment of shear wave and compressional velocity values is more often than not adequate. But occasionally separation of these values into particular distinct components at each detector $D_1, D_2 \ldots$ of the array 20 of FIG. 5 is not possible, since the ray-paths of the shear or compressional waves may not be parallel to one of the axes of response of each detector when the former emerge at each detector station $DS_1, DS_2 \ldots$ of FIG. 5. That is to say, if the dip of the reflector of the earth formation undergoing survey and critical angle of the refracted waves are such that separation along the axes of response of the detector does occur, then compressional and shear wave arrival times at each detector $D_1, D_2 \ldots$ etc., are usually ascertainable.

However, occasionally the ray-paths are not parallel to the response axes of the detectors. Hence, there are components of each in the outputs of two or more of the sub-detectors 300–302 of FIG. 20. In FIG. 20, assume that each detector $D_1, D_2 \ldots$ of FIG. 5 is composed of three sub-detectors 300, 301, 302 whose axes of response are at right angles to each other. In more detail, sub-detector 300 is seen to have an axis of response "V" parallel to vertical arrow 303; sub-detector 301 is known to have an axis of response "T" normal to both the direction of array traverse 304 and response axes "V"; while sub-detector 302 is indicated to have an axis of response "R" parallel to the direction of array traverse 304 but to be normal to both axes of response "V" and "T" of the sub-detectors 300 and 301, respectively. If the compressional or shear ray-path is not parallel to one respective axis of response, i.e., V, R or T of FIG. 20, then components of both the compressional and shear waves can appear at two or more of the outputs of the sub-detectors 300–302. Such "combined" traces can of course be difficult to interpret exact arrival times.

Referring now to FIGs. 21 and 22, there are shown flow diagrams of the modification of the present invention illustrating steps in a computer-dominated process for correctly interpreting detector outputs irrespective of orientation of ray-paths of the emerging shear or compressional waves, the dip of the subterranean reflector or the critical angle of the refracted wave, such detector outputs being rapidly and easily interpretable as compressional or shear-wave, as well as being separately displayed.

Generally, as shown in FIG. 21, the process contemplates the following steps:
(i) generating address tags for the outputs of each subdetector 300–302 of FIG. 20;
(ii) manipulating the addressed data of (i), supra, to generate a series of 3-D hodographs to indicate particle motion, and
(iii) displaying the hodographs, individually or in combination, to indicate wave type, viz., either compressional, shear, Rayleigh, etc., as set forth in detail below.

Now in more detail, consider the flow chart of FIG. 22. As shown, the initial four steps of the process are standard procedures to the seismic processing industry, viz., (i) initializing and reading of variables of a namelist, (ii) opening the input files; (iii) reading in the master file, and (iv) setting up the index and sort array. Then, the main sub-routine is called, viz., "PLHODO" and the 3-D hodographs are generated in the manner set forth below.

Of import in the present aspect of the modification of the invention is the operation of the last-mentioned step of the computer-dominated process, viz. the sub-routine called "PLHODO". Essentially, during this aspect of the present invention, the process is controlled so as to manipulate the addressed traces to generate isometric projections (in two dimensions) of similar—timewise—V, R and T values and then to display the resulting plots. In this regard, note that 3-D hodographs are defined as plots of particle motion at a specific detector location in which particle motion in three dimensions is projected into two dimensions, as a function of time.

Assuming in the case to be described hereinbelow that only three-dimensional hodographs are to be generated, among input values required of the program are the usual "standard" parameters:
required space for the traces;
type of array to be used for each trace;
trace identification;
scaling interval;
sampling interval; and
number of traces per scaling interval.

After the traces are read into the system set forth in FIG. 18, the computer-dominated system there depicted provides individual trace plots of each detector. Assume that each detector is composed of the three finite sub-detectors of FIG. 20, and that the sub-detectors 300–302 have axes of response, as shown.

From the three separate sub-detectors 300–302, there are provided three separate amplitude-vs.-time traces 306 as shown in FIG. 24, along with a three-dimensional hodograph 307. Note that the traces 306 as well as the hodographs 307 appear together as a single display at the output of the processing system of FIG. 18.

In order to understand the concept of projection of the coincident V, R and T vectors to form an isometric display of only two X and Y associated vectors, consideration is now given to the mathematical model created by the central processor of the system of FIG. 18. In FIG. 23 the mathematical modeling essentially transposes and translates the instantaneous V, R and T vectors (amplitude and direction) as shown in FIG. 23a into combined X and Y projections on a two-dimensional X and Y plane; see FIG. 23b. Transpositions include rotation of the position data about the vertical axis (FIG. 23c) as well as tilting of the same data from the same axis; see FIG. 23d. Result: two-vector transposition of three V, R and T vectors, shown in FIG. 23e, occurs early on a continuous time basis. Thereafter, the end point vector coordinates are translated to plot scale and plotted in the manner of FIG. 24.

Note in FIG. 24 that a series of timing lines or headers generally indicated at 308 appear along the left-hand side of the plot with the particular 3-D hodographs 307 being then displayed along the right-hand side of the plot as a function of time. The plots themselves are the projected data points of the various V, R and T amplitudes of the traces 308 normalized as to time, plot point and position and adjacent plot points are connected by a line to provide the depicted hodograph 307. Note that transposition of the V, R and T vector data is carried out by the system of FIG. 18 using a sub-routine called "PROJCT" while plotting of the resulting data occurs via the sub-routine called "PHLODO". Of course, in the sub-routine "PLHODO" there is a provision for changing the plot symbol every 100 milliseconds. Reason: to avoid over-emphasis of the final display.

By analysis of the resulting hodographs, the interpreter can determine, with precision, actual values of compressional and shear-wave velocities that have been received at the detector stations in the field. In general, in the interpretation of the hodographs 307 as provided by the present invention, a few keys should be apparent to those skilled in the art. In particular, in FIG. 24, P-waves are identified by the number 307a and associated with a time line of about 0.85 second to almost the total exclusion of any other type of energy. Also note that the hodograph energy identified by the number 307b indicates that shear waves are present about the time line associated with 1.25 seconds. These waves are horizontally polarized, while hodograph energy identified by the number 307c indicates that Rayleigh waves are present over the particular indicated response period of the subdetectors. At about 0.45 second, the hodograph energy is thought to be either a direct wave or a vertically polarized shear wave, i.e., at the marker 307d.

Note further with regard to FIG. 24, that the V, T and R traces 306 are usually plotted first on a side-by-side basis, followed by a simple run of hodograph 307 as a function of time. Annotation of the hodograph axes usually occurs before the particular tagged data points of the V, T and R traces are converted to plot scale, and the phantom points marked or otherwise indicated in the record. Lastly, lines are drawn through adjacent phantom scaled points to form the hodograph 307 depicted in FIG. 24.

Of course, during the interpretation aspects of the invention, the system itself its continuously cross-checking parameters to indicate occurrence of errors in the programming, if any.

Lastly, analysis can conclude by the interpretor classifying particle motion of each hodograph 307 as being horizontal, vertical or circular in the manner of the shear, compressional and Rayleigh wave patterns of FIGS. 4A-4C, supra.

It should thus be understood that the invention is not limited to any specific embodiments set forth herein, as variations are readily apparent, and thus the invention is to be given the broadest possible interpretation within the terms of the following claims.

The embodiments of the invention in which an exclusive property or privilege is claimed are defined as follows:

1. Method of accurately determining shape and elastic parameters of an earth formation to identify ore, marker rocks, economic minerals or the like, using a refraction exploration field system including a series of detectors, positioned along a line or survey at inline positions $X_1, X_2, \ldots X_n$ and at least one seismic source located adjacent to said detectors for producing a seismic wave for travel through said formation:
   (a) generating a seismic wave at a first sourcepoint location adjacent said series of detectors;
   (b) after said wave undergoes refraction, detecting arrival of a refracted wave at said series of detectors at said inline offset positions, to obtain a first set of traces associated with said offset positions $X_1, X_2, \ldots X_n$;
   (c) repeating steps (a) and (b) by generating a second wave at a second sourcepoint adjacent to inline position $X_n$ of said detector positions, and detecting said refracted wave to obtain a second set of traces;
   (d) advancing said series of detectors a selected number of inline positions or fractions thereof and repeating steps (a), (b) and (c) above to obtain additional sets of traces, but in which said additional sets of traces are associated with more than two inline positions overlapping common inline positions of said first and second sets of traces;
   (e) distinguishing arrival times of shear waves from compressional waves by means of a three-dimensional isometric hodograph generated by a computer-dominated process; and
   (f) depicting representations of arrival times of at least one segment of (i) shear waves and (ii) compressional waves as a function of inline position whereby shape of said earth formation as well as elastic parameters indicative of likelihood of said formation being an ore, marker rock, economic mineral, and the like, are provided.

2. The method of claim 1 in which step (e) includes the substeps of
   (i) plotting V, T and R amplitude-vs.-time traces on a side-by-side basis to form a record; and
   (ii) on said record also plotting an isometrically projected hodograph associated with instantaneous V, T and R amplitude-vs.-time values, so as to distinguish arrival times of compressional and shear waves associated with and appearing along said side-by-side V, T and R traces.

3. Method of claim 2 in which sub-step (ii) includes:
   (a) annotating T, V and R axes of said sometrically projected hodograph. as well as time lines of said V, T and R traces; and
   (b) after converting all trace data points to correctly translated and transposed plot scale, plotting on said record straight lines between said scaled data points, to form said isometrically projected hodograph on said record.

4. Method of claim 3 in which sub-step (ii) includes the additional steps of
   (c) classifying particle motion associated with said hodograph as horizontal, vertical or circular motion; and
   (d) based on said hodograph being classified as horizontal, vertical or circular motion, determining arrival times of said traces as being associated with shear, compressional or Rayleigh waves, respectively.

5. In accurately determining shape and elastic parameters of an earth formation to identify ore, marker rocks, economic minerals or the like, using a refraction exploration field system including a series of detectors, positioned along a line of survey at inline positions $X_1, X_2, \ldots X_n$ and at least one seismic source located adjacent to said detectors for producing a seismic wave for travel through said formation, means for distinguishing arrival times of refracted shear waves from compressional waves by means of an isometrically projected, generated hodograph, and means for plotting representations of said distinguished refracted travel time values versus horizontal offset coordinate annotated by sourcepoint-profile number and refraction arrival direction indicated by sourcepoint offset positions at one of a forward and trailing inline position $X_l$ and $X_n$ of seaid detectors, slope of said travel time values versus offset being indicative of apparent P-wave and/or S-wave velocities, said sourcepoint offset positions being alignable along an imaginary line of ascertainable slope.

6. Means of claim 5 in which said distinguishing means inclues means for classifying particle motion of said hodograph as vertical, horizontal or circular.

7. Means of claim 5 in which said plotting means includes means for selecting refraction events from field data provided by said refraction field system, and means for plotting said events to indicate refraction travel time as a formation of horizontal offset.

8. Means of claim 5 in which said first- and second-mentioned means are a properly programmed digital computer.

* * * * *